(12) United States Patent  
Kawasaki et al.

(10) Patent No.: US 12,208,334 B2  
(45) Date of Patent: Jan. 28, 2025

(54) INFORMATION PROCESSING SYSTEM, INFORMATION PROCESSING METHOD, AND NON-TRANSITORY COMPUTER READABLE MEDIUM

(71) Applicant: CYGAMES, INC., Tokyo (JP)

(72) Inventors: Seishi Kawasaki, Tokyo (JP); Atsushi Yamazaki, Tokyo (JP); Hiroaki Takaara, Tokyo (JP)

(73) Assignee: CYGAMES, INC., Tokyo (JP)

( * ) Notice: Subject to any disclaimer, the term of this patent is extended or adjusted under 35 U.S.C. 154(b) by 88 days.

(21) Appl. No.: 17/662,411

(22) Filed: May 6, 2022

(65) Prior Publication Data

US 2022/0258058 A1    Aug. 18, 2022

Related U.S. Application Data

(63) Continuation of application No. PCT/JP2020/041561, filed on Nov. 6, 2020.

(30) Foreign Application Priority Data

Nov. 8, 2019    (JP) .................................. 2019-203022

(51) Int. Cl.
*A63F 13/00* (2014.01)
*A63F 13/69* (2014.01)

(52) U.S. Cl.
CPC .................................... *A63F 13/69* (2014.09)

(58) Field of Classification Search
CPC ............. G07F 17/3244; G07F 17/3251; G07F 17/3248

See application file for complete search history.

(56) References Cited

FOREIGN PATENT DOCUMENTS

| JP | 5103508 B2 | 12/2012 |
| JP | 2017184823 A | * 10/2017 |
| JP | 2017184828 A | * 10/2017 |
| JP | 2017184829 A | * 10/2017 |

OTHER PUBLICATIONS

International Search Report issued in PCT/JP2020/041561, mailed on Dec. 1, 2020 (8 pages).
Written Opinion of the International Searching Authority PCT/JP2020/041561, mailed on Dec. 1, 2020 (5 pages).

(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

An information processing system comprising a computer configured to execute: executing, on the basis of a determination request operation input by a player, determination processing for determining one of a plurality of kinds of game media belonging to one of selected types currently being conducted; storing, as a possessed game medium, the determined game medium in a storage unit in association with a player ID; executing a prescribed game by using the possessed game medium stored in the storage unit; allowing the execution of the determination processing, during a certain period that is set for each player, for the selected type conducted in the past.

6 Claims, 33 Drawing Sheets

(56) References Cited

OTHER PUBLICATIONS

Wiki [online]; "[Pocodun] 48 Hours Only: Start Dash God Rush Available. Pocodun Complete Strategy", Nov. 30, 2017, web archive dated Oct. 25, 2018 [retrieved on Nov. 20, 2020], Internet: <URL:https://web.archive.org/web/20181025065944/https://gamy.jp/pocodun/pocodun-gacha-gr-48 >(8 pages).
Try Box Gacha One More Time !; "Box Gacha Re-Release" for Sale, Logres of Swords and Sorcery?Godess of Ancient, [online], Jan. 1, 2017 [retrieved on Nov. 20, 2020], <URL:https://sp.mmo-logres.com/news/051630/5823/> (4 pages).
"Special Fest Gacha Function" Added! [online], Sep. 3, 2019 [retrieved on Nov. 20, 2020], URL: <https://priconneredive>.jp/news/information/5823/ (6 pages).
Office Action issued in the counterpart Japanese Patent Application No. 2019-203022, mailed on Jun. 16, 2020 (8 pages).
Office Action issued in the counterpart Japanese Patent Application No. 2019-203022, mailed on Nov. 17, 2020 (6 pages).

\* cited by examiner

| Priority | Content of balloon image |
|---|---|
| 1 | Exchangeable in Fest |
| 2 | Exchangeable in SP fest |
| 3 | Exchangeable in Pickup |
| 4 | Free series of ten is being held |
| 5 | Fest being held |
| 6 | SP fest being held |
| 7 | Three stars fixed being held |

FIG.10B

INFORMATION PROCESSING SYSTEM, INFORMATION PROCESSING METHOD, AND NON-TRANSITORY COMPUTER READABLE MEDIUM

CROSS REFERENCE TO RELATED APPLICATIONS

This application is a continuation application of International Application No. PCT/JP2020/041561, filed on Nov. 6, 2020, which claims priority to Japanese Patent Application No. 2019-203022, filed on Nov. 8, 2019, the entire contents of which are incorporated by reference herein.

BACKGROUND ART

Technical Field

The present invention relates to information processing systems, information processing methods, and information processing programs.

There has hitherto been a type of information processing system in which it is possible to acquire items, characters, etc. that are used in a game by executing lotteries called gacha for free or for a fee. For example, according to Patent Literature 1, for players who have just started a game, lotteries are performed by using a lottery table in which items and characters having high rarity values appear.

CITATION LIST

Patent Literature

Patent Literature 1: Publication of Japanese Patent No. 5103508

SUMMARY OF INVENTION

Technical Problem

Meanwhile, there are cases where it is possible to acquire special items, characters, etc. during a prescribed period in an information processing system. For example, a player newly starting a game can acquire the special items, the characters, etc. if the player starts the game during the prescribed period mentioned above; however, if the player starts the game not during the prescribed period, the player cannot acquire the special items, the characters, etc., which might decrease motivation for the game.

It is an object of the present invention to provide an information processing system, an information processing method, and an information processing program that make it possible to increase motivation for a game.

Solution to Problem

In order to solve the problem described above, an information processing system includes: a determination unit that executes, on the basis of a determination request operation input by a player, determination processing for determining one of a plurality of kinds of game media belonging to one of selected types currently being conducted; a game-medium storage unit that stores, as a possessed game medium, the game medium determined by the determination unit in a storage unit in association with a player ID; a game execution unit that executes a prescribed game by using the possessed game medium stored in the storage unit; and a management unit that allows the execution of the determination processing, during a certain period that is set for each player, for the selected type conducted in the past.

For the individual selected types, the storage unit may store lottery tables in which at least either of the game media that belong thereto and lottery probabilities of the game media mutually vary, as well as periods during which it is allowed to refer to the lottery tables; the determination unit may execute the determination processing for determining the game medium through a lottery with reference to the lottery table based on the determination request operation; and the management unit may determine the lottery table that is referred to in the determination processing for the selected type conducted in the past on the basis of the periods during which it is allowed to refer to the lottery tables.

The management unit may determine, as the lottery table that is referred to in the determination processing for the selected type conducted in the past, the lottery table whose period during which reference is allowed is nearest with respect to the timing at which a prescribed condition is satisfied.

The lottery table that is referred to in the determination processing for the selected type conducted in the past may be configured such that the winning probability of a specific one of the game media is higher than in the other lottery tables or such that a special one of the game media may be won.

In order to solve the problem described above, an information processing method includes: a step of executing, on the basis of a determination request operation input by a player, determination processing for determining one of a plurality of kinds of game media belonging to one of a plurality of selected types currently being conducted; a step of storing, as a possessed game medium, the determined game medium in a storage unit in association with a player ID; a step of executing a prescribed game by using the possessed game medium stored in the storage unit; and a step of allowing the execution of the determination processing, during a certain period that is set for each player, for the selected type conducted in the past.

In order to solve the problem described above, an information processing program causes a computer to function as: a determination unit that executes, on the basis of a determination request operation input by a player, determination processing for determining one of a plurality of kinds of game media belonging to one of selected types currently being conducted; a game-medium storage unit that stores, as a possessed game medium, the game medium determined by the determination unit in a storage unit in association with a player ID; a game execution unit that executes a prescribed game by using the possessed game medium stored in the storage unit; and a management unit that allows the execution of the determination processing, during a certain period that is set for each player, for the selected type conducted in the past.

Effects of Disclosure

The present invention makes it possible to increase motivation for a game.

BRIEF DESCRIPTION OF DRAWINGS

FIG. 10B is an illustration for explaining priorities of balloon images.

DESCRIPTION OF EMBODIMENTS

An aspect of an embodiment of the present invention will be described below in detail with reference to the accompanying drawings. The dimensions, materials, specific numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
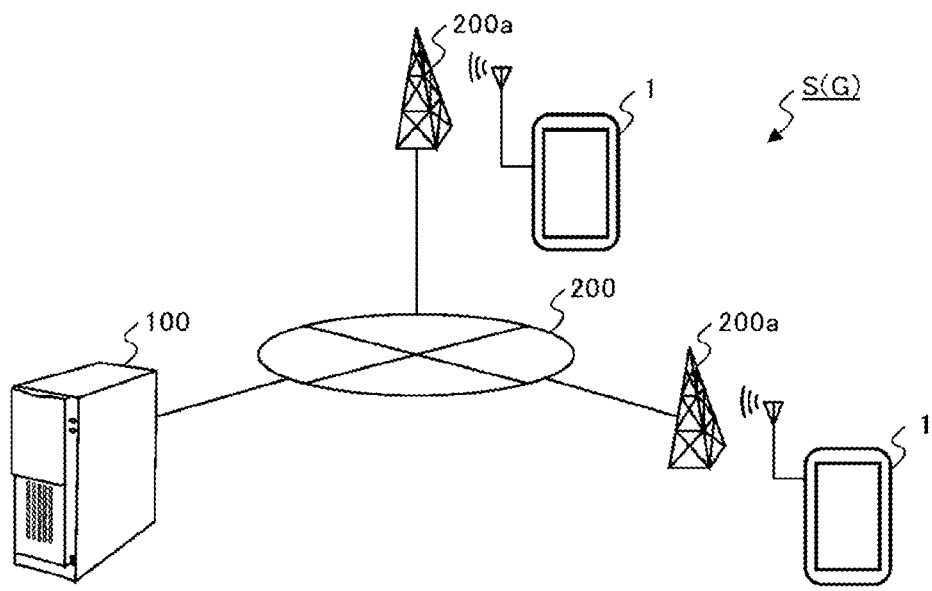
FIG. 1 is an explanatory illustration schematically showing the configuration of an information processing system.

FIG. 1 is an explanatory illustration schematically showing the configuration of an information processing system S. The information processing system S is what is called a client-server system including player terminals 1, a server 100, and a communication network 200 having communication base stations 200a.

The player terminals (information processing devices) 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 accumulates various kinds of information (player information) for each player ID for identifying a player who plays a game.

The communication base stations 200a are connected to the communication network 200, and send information to and receive information from the player terminals 1 in a wireless manner. The communication network 200 is implemented by a mobile phone network, an Internet network, a local area network (LAN), a special circuit, or the like, and realizes wireless or wired communicative connections between the player terminals 1 and the server 100.

In the information processing system S in this embodiment, the player terminals 1 and the server 100 function as a game device G. The player terminals 1 and the server 100 individually share roles for controlling the proceeding of the game, and it becomes possible to proceed with the game through cooperation between the player terminals 1 and the server 100.

(Hardware Configurations of Player Terminals 1 and Server 100)

Figure 2A:
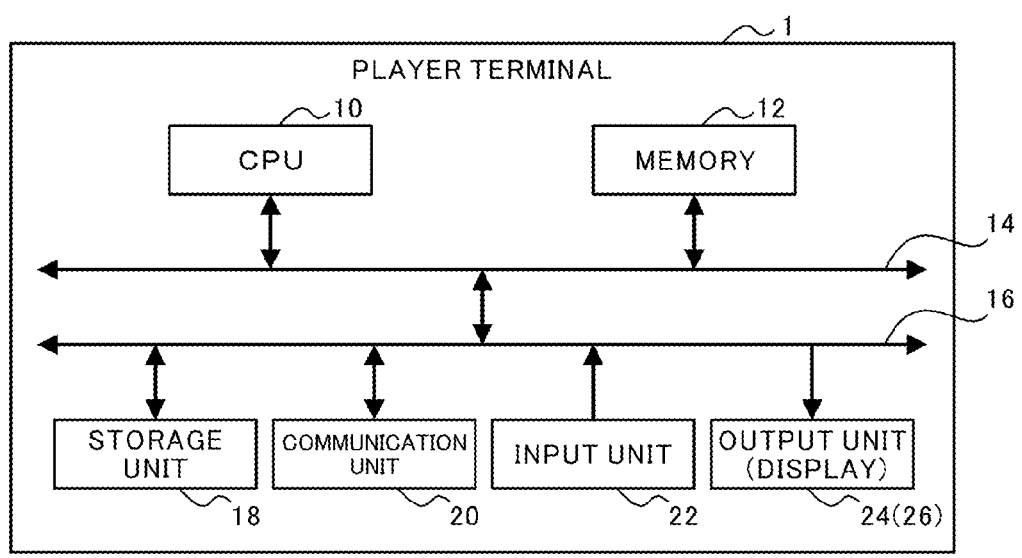
FIG. 2A is a diagram for explaining the hardware configuration of a player terminal.
Figure 2B:
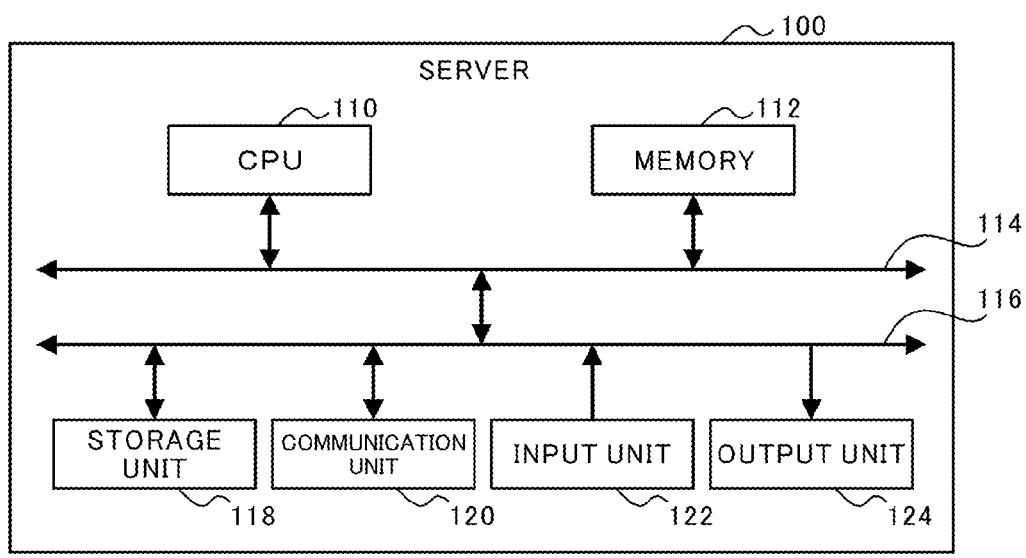
FIG. 2B is a diagram for explaining the hardware configuration of a server.

FIG. 2A is a diagram for explaining the hardware configuration of a player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 100.

The CPU 10 runs programs stored in the memory 12 to control the proceeding of the game. The memory 12 is configured of a read only memory (ROM) or a random access memory (RAM), and stores the programs and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station 200a in a wireless manner, and sends information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touchscreen, buttons, a keyboard, a mouse, a cross keypad, or an analog controller. Alternatively, the input unit 22 may be a special controller provided at the player terminal 1 or connected (externally) to the player terminal 1. Yet alternatively, the input unit 22 may be configured of an acceleration sensor that detects tilting or movement of the player terminal 1 or a microphone that detects player's voice. That is, the input unit 22 includes a wide range of devices that enable the input of player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24, and includes a touchscreen provided as stacked on the display 26 as the input unit 22.

(Game Specifics)

Next, the specifics of the game provided by the information processing system S (game device G) in this embodiment will be described by using an example. In this embodiment, what is called a battle game, in which ally characters play battles against enemy characters, is provided. Specifically, in the game in this embodiment, a plurality of ally characters are provided. The player selects a plurality of (five here) ally characters from the provided ally characters to form a party. Furthermore, the player can play a plurality of kinds of battle games involving different enemy characters or having different difficulty levels. The objective of the battle game is that the ally characters formed into the party beat (clear) the enemy characters to acquire rewards.

Figure 3A:
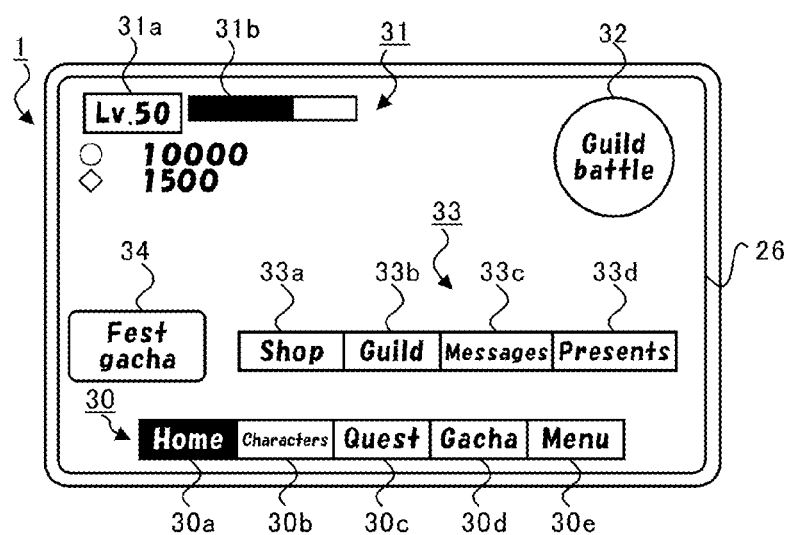
FIG. 3A is an illustration for explaining an example home screen.
Figure 3B:
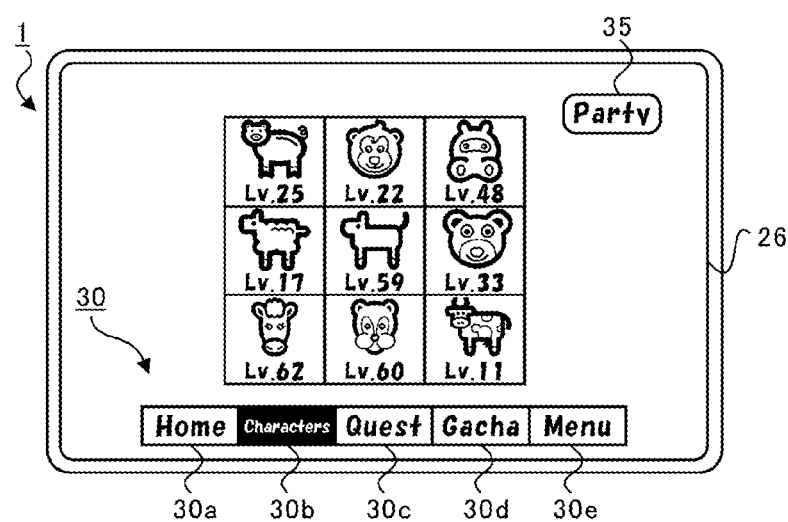
FIG. 3B is a first illustration for explaining an example ally-character confirmation screen.
Figure 3C:
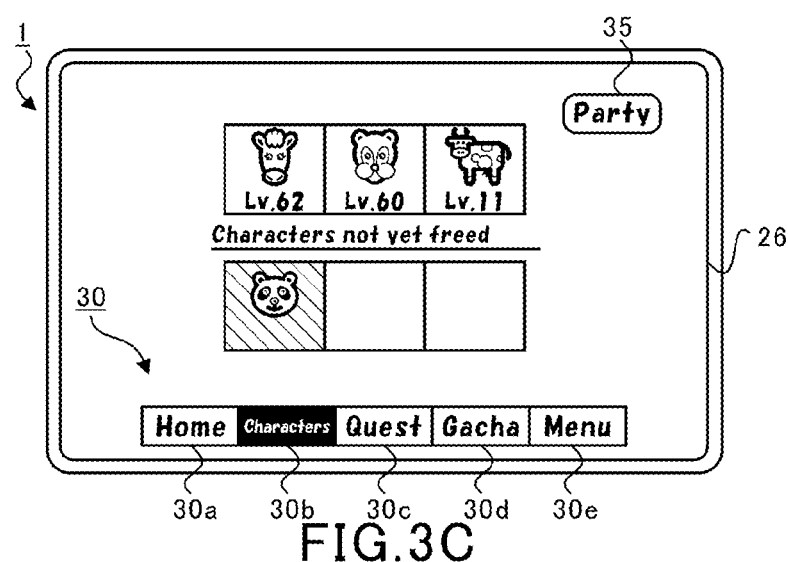
FIG. 3C is a second illustration for explaining an example ally-character confirmation screen.

FIG. 3A is an illustration for explaining an example home screen. FIG. 3B is a first illustration for explaining an example ally-character confirmation screen. FIG. 3C is a second illustration for explaining an example ally-character confirmation screen. The display 26 of the player terminal 1 displays game screens. In this embodiment, the game screens are broadly classified into normal screens and battle screens.

The normal screens are mainly screens for allowing the player to make various kinds of setting and to confirm information. Meanwhile, the battle screens are screens that are displayed on the display 26 from the start to the end of a battle game. Here, all the screens other than the battle screens are the normal screens. A plurality of screens are provided as the normal screens, such as the home screen shown in FIG. 3A, the ally-character confirmation screens shown in FIGS. 3B and 3C, quest screens (see FIG. 4A), gacha screens (see FIGS. 6A, 7A, and 7B), as well as shop screens, guild screens, and menu screens that are not shown.

In the normal screens, a menu bar 30 is displayed in a lower part of the display 26. In the menu bar 30, a plurality of operating parts that can be operated (tapped) by the player are provided. In the menu bar 30, the following operating parts are provided: a home-screen selection operating part 30a labelled as "Home"; an ally-character-confirmation-screen selection operating part 30b labelled as "Characters"; a quest-screen selection operating part 30c labelled as "Quest"; a gacha-screen selection operating part 30d labelled as "Gacha"; and a menu-screen selection operating part 30e labelled as "Menu".

Figure 4A:
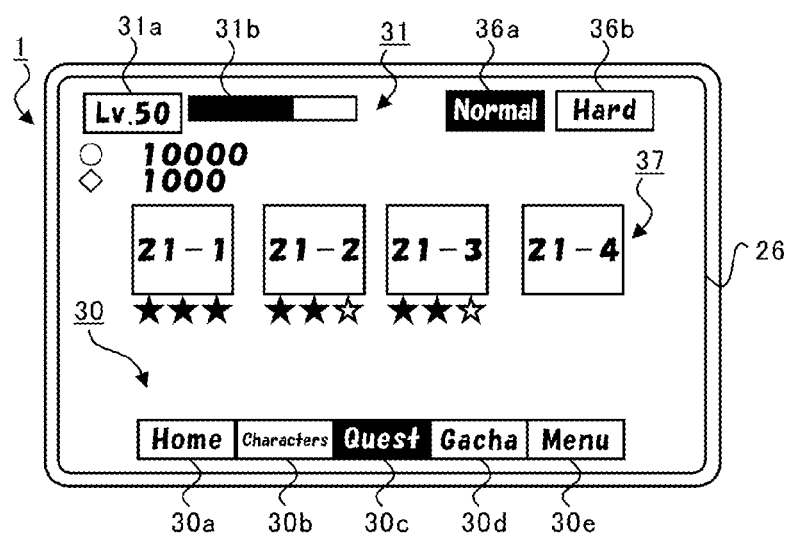
FIG. 4A is an illustration for explaining an example quest screen.
Figure 6A:
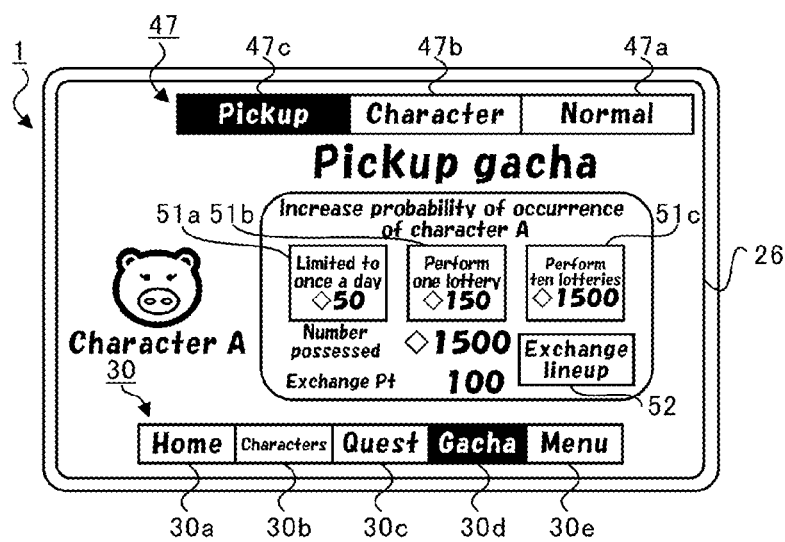
FIG. 6A is an illustration for explaining an example gacha screen.
Figure 7A:
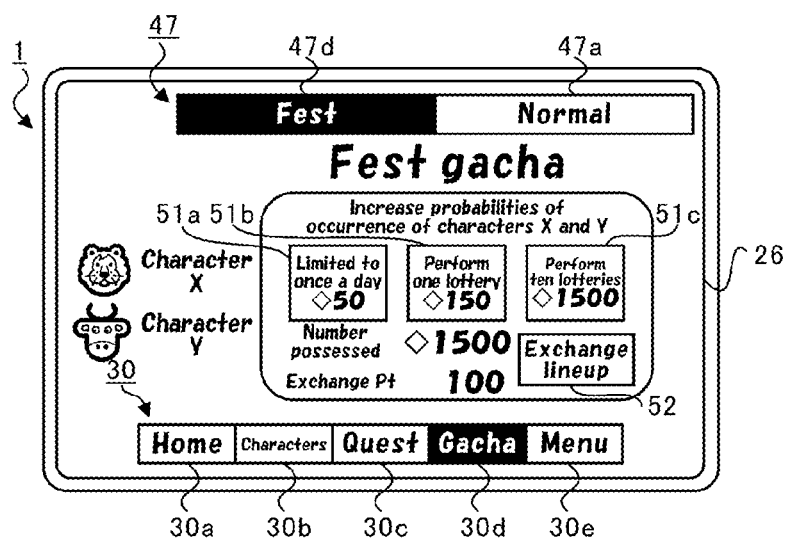
FIG. 7A is an illustration for explaining an example gacha screen in a fest holding period.
Figure 7B:
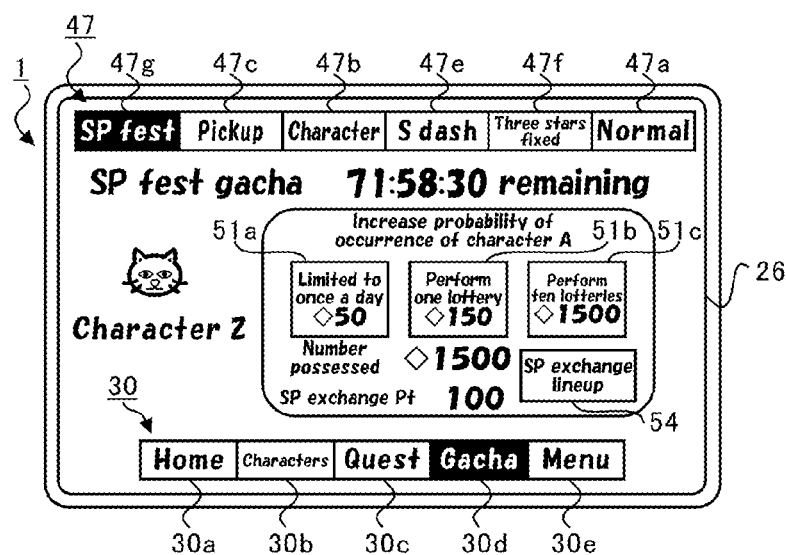
FIG. 7B is an illustration for explaining an example gacha screen in an SP-fest holding period.

When the home-screen selection operating part 30a is tapped, the home screen shown in FIG. 3A is displayed on the display 26. Furthermore, when the ally-character-confirmation-screen selection operating part 30b is tapped, one of the ally-character confirmation screens shown in FIGS. 3B and 3C is displayed on the display 26. Similarly, when the quest-screen selection operating part 30c is tapped, the quest screen shown in FIG. 4A is displayed on the display 26. Furthermore, when the gacha-screen selection operating part 30d is tapped, one of the gacha screens shown in FIGS. 6A, 7A, and 7B is displayed on the display 26. Furthermore, when the menu-screen selection operating part 30e is tapped, a menu screen is displayed on the display 26. Although not described in detail, it is possible to make settings for the game and to confirm various kinds of information via the menu screen.

In the menu bar 30, the operating part corresponding to each screen is indicated in a highlighted manner so that the screen being displayed on the display 26 can be distinguished.

The home screen shown in FIG. 3A corresponds to an initial screen, and a header display area 31 is provided in an upper part thereof. In the header display area 31, the following items of information are displayed: level information 31a indicating the player level associated with the player ID; a stamina display bar 31b indicating the stamina of the player associated with the player ID; and the possessed amounts of a first currency (indicated by a circle symbol in the figure) and a second currency (indicated by a diamond symbol in the figure) associated with the player ID.

The stamina is a parameter necessary for playing a battle game. In this embodiment, a plurality of kinds of battle games are provided, and each of the battle games has set therefor a value of stamina consumption needed for a play, the number of challenges per day, etc. In the case of playing a battle game for which a value of stamina consumption needed for a play is set, the player has to consume stamina in order to play the battle game, and thus the player cannot play the battle game in the case where the stamina is insufficient.

Although not described in detail, when the player clears a battle game, the player can acquire a prescribed value as a player experience value. Furthermore, the player level becomes higher each time the player experience value reaches a certain value. Player levels have set therefor stamina upper limit values, and the stamina upper limit value becomes higher as the player level becomes higher. Stamina is recovered by a prescribed value (e.g., one point) per certain time (e.g., five minutes) within the upper limit. In the stamina display bar 31b, the current remaining amount of stamina is displayed so as to be visually recognized in relation to the stamina upper value.

The first currency and the second currency are currencies that are available only in the game. For example, when a battle game is cleared, a prescribed amount of the first currency can be acquired in accordance with the cleared battle game. The second currency can be acquired for free or for a fee. Although the first currency and the second currency can be acquired in various ways, detailed descriptions thereof will be omitted.

Furthermore, there are cases where a notification selection operating part 32 is displayed at the right end of the home screen. Although not described in detail, in the case where a guild battle is being played, a notification selection operating part 32 labelled as "Guild battle" is displayed.

Furthermore, a home menu 33 is displayed between the menu bar 30 and the notification selection operating part 32 in the home screen. In the home menu 33, the following operating parts are provided: a shop-screen selection operating part 33a labelled as "Shop"; a guild-screen selection operating part 33b labelled as "Guild"; a message-screen selection operating part 33c labelled as "Messages"; and a present-screen selection operating part 33d labelled as "Presents".

When the shop-screen selection operating part 33a is tapped, a shop screen via which items can be purchased, which is not shown, is displayed. Furthermore, when the guild-screen selection operating part 33b is tapped, a guild screen, which is not shown, is displayed on the display 26. Furthermore, when the message-screen selection operating part 33c is tapped, a message screen displaying update information, maintenance information, etc., which is not shown, is displayed on the display 26. Furthermore, when the present-screen selection operating part 33d is tapped, for example, a present screen displaying an item distributed from the administrator, which is not shown, is displayed on the display 26.

Furthermore, a banner 34 is displayed on the left side of the home menu 33 in the home screen. As will be described later in detail, various images are displayed in the banner 34. Furthermore, in the case where there are a plurality of images that can be displayed as the banner 34, one of the plurality of images is displayed as the banner 34 by way of switching in accordance with a swipe operation by the player.

In the ally-character confirmation screen shown in FIG. 3B, all the images of the ally characters corresponding to ally character IDs associated with the player ID are displayed. That is, in the ally-character confirmation screen, all the ally characters possessed by the player are displayed. Note that the ally character IDs (game media) are provided for the identification of ally characters, and thus different IDs are assigned to the individual ally characters. Furthermore, when the player acquires a new ally character, for example, through gacha (lottery), the ally character ID (possessed game medium) of the acquired ally character is associated with the player ID of the player.

In the ally-character confirmation screen, the images of the ally characters are scrolled and displayed in accordance with scroll operations by the player. Furthermore, in the ally-character confirmation screen, as shown in FIG. 3C, under the images of the ally characters possessed by the player, images of the ally characters not possessed by the player (the ally character IDs not associated with the player ID) are displayed, as characters not yet freed, in a display mode (indicated by hatching in the figure) different from that of the images of the ally characters possessed by the player. Here, specifically, the ally characters that are displayed as characters not yet freed are only ally characters that can be acquired through gacha (lottery), which will be described later, and ally characters that cannot be acquired through gacha (lottery) are not displayed as characters not yet freed.

At the right end of the ally-character confirmation screen, a party-screen selection operating part 35 labelled as "Party" is displayed. When the party-screen selection operating part 35 is tapped, a party formation screen, which is not shown, is displayed on the display 26, which makes it possible to form and save a party constituted of five ally characters at most.

For each character, stars (rank), an experience value, and a level are stored in association therewith. The experience value is increased in the case where a battle game is won or in the case where a prescribed item is used, which will be described later. The ally characters individually have set therefor one to three stars (ranks) as the initial ranks thereof. The level is set in association with the experience value, and the level becomes higher each time the experience value reaches a prescribed value. Note that each ally character has set therefor an upper limit value for the level, and the level can become higher only within the range of the upper limit value.

Furthermore, each ally character has set therefor base values of battle abilities, such as life points, an attacking ability, and a defending ability, on the basis of the stars and the level. The player can proceed with battle games more advantageously as the battle abilities of the ally characters become higher. Furthermore, the individual base values set for the ally characters become higher as the stars increase and as the level becomes higher.

Furthermore, each ally character can be equipped with (can have set therefor) equipment such as a weapon and an armor. Each item of equipment has set therefor values to be added to the attacking ability, the defending ability, etc. When an ally character is equipped with equipment, the additional values of the individual items of equipment are added to the base values mentioned above, which makes it possible to enhance the battle abilities of the ally character.

Figure 4B:
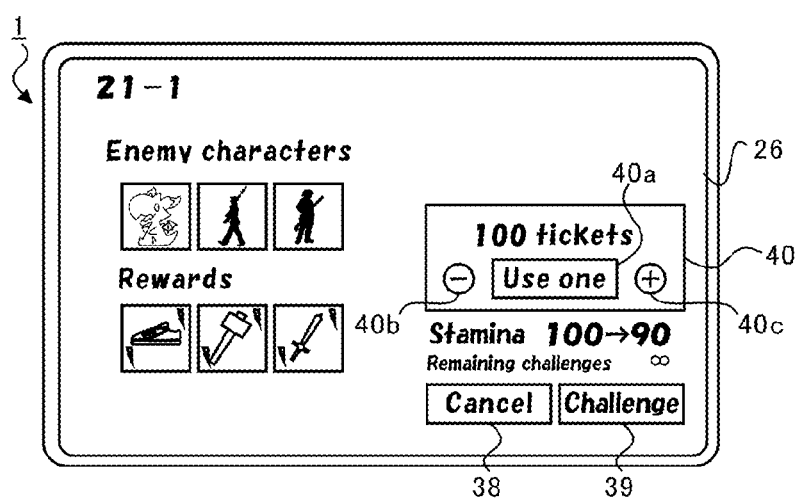
FIG. 4B is an illustration for explaining an example quest selection screen.
Figure 4C:
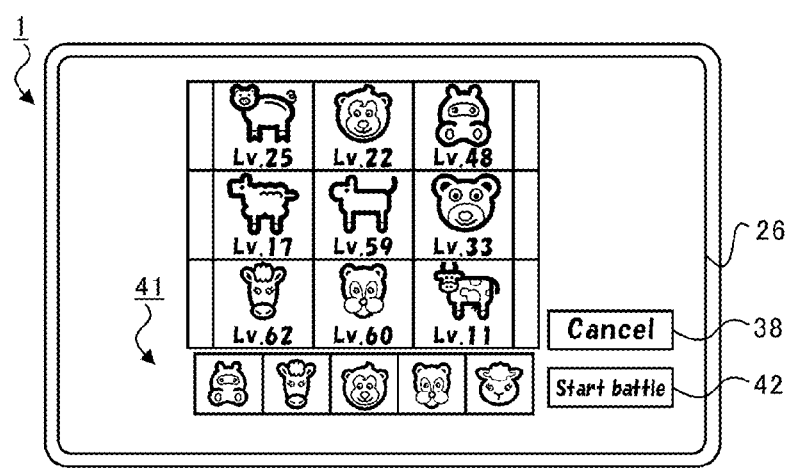
FIG. 4C is an illustration for explaining an example party selection screen.

FIG. 4A is an illustration for explaining an example quest screen. FIG. 4B is an illustration for explaining an example quest selection screen. FIG. 4C is an illustration for explaining an example party selection screen.

When the quest-screen selection operating part 30c is tapped in the home screen shown in FIG. 3A, the quest screen shown in FIG. 4A is displayed on the display 26. Although this embodiment will be described in the context of normal quests as an example of the type of battle games, other types of battle games (hard quests, guild battles, etc.) may be provided.

Note that opening conditions are set depending on the type of battle games. Examples of the opening conditions include a condition that the player level is greater than or equal to a prescribed value and a condition that the player has cleared prescribed other battle games. Furthermore, a plurality of battle games (layers) belong to each type of battle games. Opening conditions are also set individually for these battle games. Furthermore, when an opening condition is satisfied, game opening information included in the player information is updated.

In the quest screen, the following operating parts are provided: a normal-quest selection operating part 36a for selecting a normal quest; and a hard-quest selection operating part 36b for selecting a hard quest. The quest screen is configured so as to be always in a state where either the normal-quest selection operating part 36a or the hard-quest selection operating part 36b is selected, and the normal-quest selection operating part 36a is selected in the initial state.

In the case where the normal-quest selection operating part 36a is selected, quest operating parts 37 for selecting one of the plurality of battle games (layers) belonging to normal quests is displayed in the quest screen.

In the quest operating parts 37, clearing information concerning the individual battle games is also displayed. For example, the clearing information is indicated by using three stars. In a battle game, when the battle game is cleared, stars are acquired in accordance with the number of ally characters whose life points have become zero at the time of clearing. For example, three stars are acquired in the case where there is no ally character whose life points have become zero, two stars are acquired in the case where there is one ally character whose life points have become zero, and one star is acquired in the case where there are two or more characters whose life points have become zero.

In the example in FIG. 4A, three stars are acquired in the battle game "21-1", two stars are acquired in the battle game "21-2", and two stars are acquired in the battle game "21-3". Furthermore, no star is acquired in the battle game "21-4", and it is reported that this battle game has not been cleared.

Note that for each quest (normal quest or hard quest), an opening condition that the immediately preceding battle game has to be cleared is set. For example, in the example in FIG. 4A, since the battle games up to and including "21-3" have been cleared, the battle game "21-4" is open, but the subsequent battle games ("21-5" and later, which are not shown) are not open.

In the quest screen, for example, when the quest operating part 37 for the battle game "21-1" is tapped, the quest selection screen shown in FIG. 4B is displayed on the display 26. In the quest selection screen, enemy characters that appear in the battle game and an item (reward) that can be acquired in the battle game are displayed. Furthermore, in the quest selection screen, the stamina before and after the execution of the battle game and the number of remaining challenges are displayed. The number of remaining challenges indicate the number of challenges allowed per day, and is set to infinity for normal-quest battle games. Furthermore, in this embodiment, the stamina that is consumed in normal-quest battle games is set to 10. However, the stamina that is consumed in normal-quest battle games may vary among the individual battle games.

Furthermore, in the quest selection screen, a cancel operating part 38 and a challenge operating part 39 for challenging the battle game, labelled as "Challenge", are displayed.

When the cancel operating part 38 is tapped, the quest screen shown in FIG. 4A is displayed on the display 26, and the challenge to the selected battle game "21-1" is cancelled.

Meanwhile, when the challenge operating part 39 is tapped, the party selection screen shown in FIG. 4C is displayed on the display 26. In the party selection screen, all the ally characters possessed by the player are displayed, and a selected-ally-character display area 41 for displaying selected ally characters are displayed thereunder.

Furthermore, in the party selection screen, a cancel operating part 38 and a battle-start operating part 42 labelled as "Start battle" are displayed.

In the party selection screen, when the player taps a displayed ally character, the operated ally character is displayed in the selected-ally-character display area 41. That is, here, among the plurality of ally character IDs associated with the player IDs, ally character IDs for use (for party determination) in the battle game are selected.

Furthermore, when the ally characters (ally character IDs) are selected and the battle-start operating part 42 is tapped, the battle game is started.

Figure 5A:
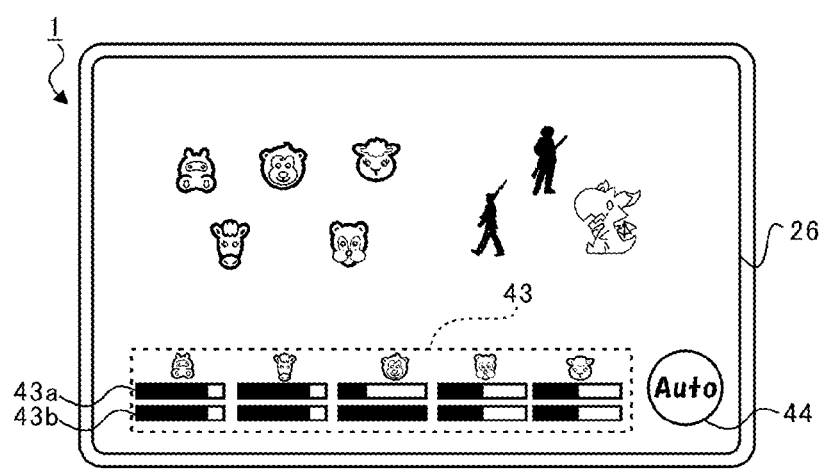
FIG. 5A is an illustration for explaining an example battle screen.
Figure 5B:
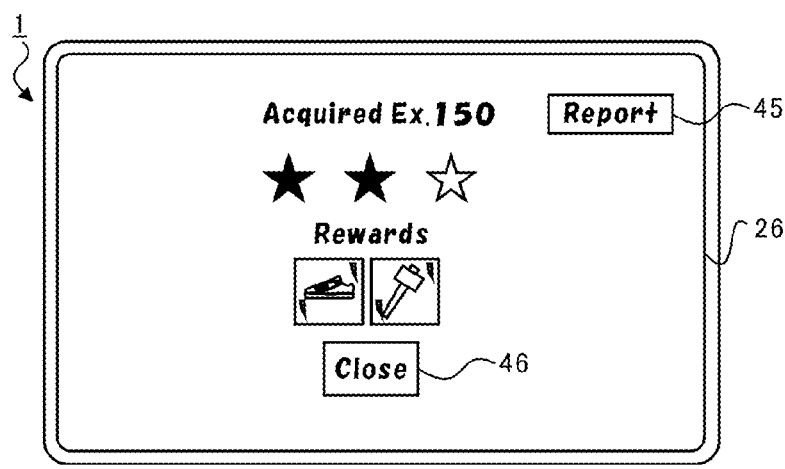
FIG. 5B is an illustration for explaining an example result screen.
Figure 5C:
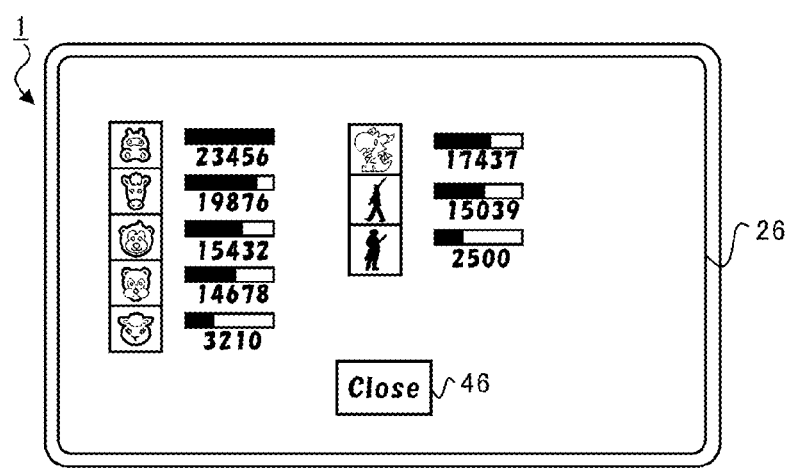
FIG. 5C is an illustration for explaining an example report screen.

FIG. 5A is an illustration for explaining an example battle screen. FIG. 5B is an illustration for explaining an example result screen. FIG. 5C is an illustration for explaining an example report screen. A battle game is started when the battle-start operating part 42 is operated (tapped) in the party selection screen shown in FIG. 4C.

During the battle game, a battle screen is displayed, as shown in FIG. 5A. In the battle screen, ally characters and enemy characters are displayed on the display 26. The ally characters take actions under computer control, and give damage to the enemy characters and receive damage from the enemy characters. Furthermore, the enemy characters take actions under computer control, and give damage to the ally characters and receive damage from the ally characters.

When damage points are given to an enemy character, the damage points are subtracted from the life points of the enemy character. Similarly, when damage points are given to an ally character, the damage points are subtracted from the life points of the ally character. The player wins (clears) when the life points of all the enemy characters become zero, and the player is defeated when the life points of all the ally characters become zero (when all the ally characters are defeated).

Here, as shown in FIG. 5A, an ally-character-details display area 43 is provided in a lower part of the battle screen. In the ally-character-details display area 43, life points 43a and a killer-move gauge 43b for each of the ally characters are displayed. The killer-move gauge 43b is raised when the ally character receives damage from an enemy character or give damage to an enemy character. Furthermore, when the killer-move gauge 43b reaches a predetermined maximum value, it becomes possible for the ally character to use a killer move. The killer move may give greater damage points to an enemy character compared with a normal attack, may recover the life points of the ally character, or may exert a special effect on an enemy character.

Here, two patterns are provided as methods for using a killer move. In one method, the player operates (taps) an ally character whose killer-move gauge 43b displayed in the ally-character-details display area 43 has reached the maximum value. In the other method, when the killer-move gauge 43b reaches the maximum value in an auto state, the ally character uses the killer move under computer control. Note that an auto selection operating part 44 is displayed in the battle screen, which makes it possible to perform switching between an auto state and a manual state in accordance with operations of the auto selection operating part 44. When the auto selection operating part 44 is tapped in the manual state, the player enters the auto state, in which the killer move is used automatically. Meanwhile, when the auto selection operating part 44 is tapped in the auto state, the player enters the manual state, in which the killer move is used manually. Note that even in the auto state, it is possible to use the killer move when the player operates (taps) an ally character in a state where the killer-move gauge 43b has reached the maximum value and the killer move has not been used under computer control.

Furthermore, when the battle game is finished normally (normal finish), a result screen is displayed on the display 26, as shown in FIG. 5B. FIG. 5B shows, as an example, a result screen after clearing the battle game.

In the result screen, the following operating parts are displayed: a report display operating part 45 labelled as "Report", in which at least a portion of game result information of the battle game is displayed; and a close operating part 46 labelled as "Close".

The game result information includes: the ally-character IDs of the ally characters (party); the enemy character IDs of the enemy characters; the status of survival of the ally characters and the enemy characters at the end of the battle game (whether or not the life points thereof have become zero at the end of the battle game); the given damage points (total values), the distinction as to the manual state or the auto state, a battle log ID, the type of the battle game (normal quest, hard quest, or the like), information (clearing information, the layer of the battle game, etc.) associated with each type of battle game, assigned item information, an assigned amount of the first currency, etc. Furthermore, the battle log ID is assigned uniquely to each battle game. Furthermore, the content of the information associated with each type of battle game varies among the individual types of battle games.

When the close operating part 46 is tapped in the result screen, what is displayed on the display 26 is switched from the battle screen to a normal screen. That is, the result screen is a part of the battle screen. The normal screen that is displayed after the switching from the result screen may be the screen that had been displayed before the switching to the battle screen, or a prescribed screen, such as the home screen. When the displayed result screen is closed, the battle game is finished.

When the report display operating part 45 is tapped in the result screen, the report screen shown in FIG. 5C is displayed on the display 26. In the report screen, the damage points (total values) given by the ally characters and the enemy characters are displayed, and a close operating part 46 is displayed.

When the close operating part 46 is tapped, the result screen shown in FIG. 5B is displayed on the display 26.

Furthermore, in the quest selection screen shown in FIG. 4B, a ticket display area 40 is provided. In the ticket display area 40, the number of tickets possessed by the player (the number of tickets associated with the player ID) is displayed, and a ticket-using challenge operating part 40a, a minus operating part 40b, and a plus operating part 40c are provided. The ticket-using challenge operating part 40a, the minus operating part 40b, and the plus operating part 40c are enabled only in battle games for which three stars have been acquired as clearing information, and are disabled in battle games for which three stars have not been acquired as clearing information.

In the case where the ticket-using challenge operating part 40a, the minus operating part 40b, and the plus operating part 40c are enabled, each time the plus operating part 40c is tapped, the text indicated in the ticket-using challenge operating part 40a is displayed such that the number of tickets is increased by one, such as "Use two" and "Use three". Meanwhile, each time the minus operating part 40b is tapped, the text indicated in the ticket-using challenge operating part 40a is displayed such that the number of tickets is decreased by one, such as "Use two" and "Use one".

Furthermore, for example, when the ticket-using challenge operating part 40a is tapped in the case where the text indicated in the ticket-using challenge operating part 40a says "Use five", the party formation in the party selection screen shown in FIG. 4C and the execution of battle games in the battle screen shown in FIG. 5A are skipped by consuming five tickets and stamina of 50. Then, it is considered that all the (five) battle games have been cleared, and the result screen shown in FIG. 5B is displayed. In the result screen, items acquired in the five battle games are displayed collectively.

As described above, by consuming tickets, battle games for which three stars have been acquired as clearing information are skipped, and it is considered that the battle games have been cleared. This makes it possible for the player to collect items in a shorter time.

Figure 6B:
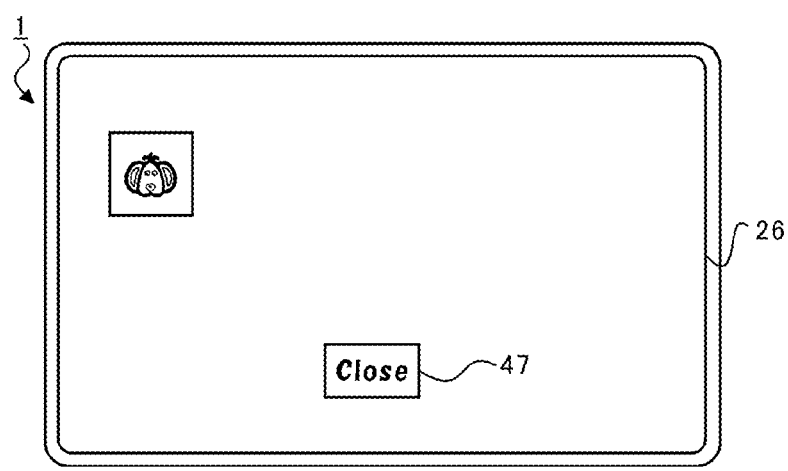
FIG. 6B is an illustration for explaining an example gacha result screen.
Figure 6C:
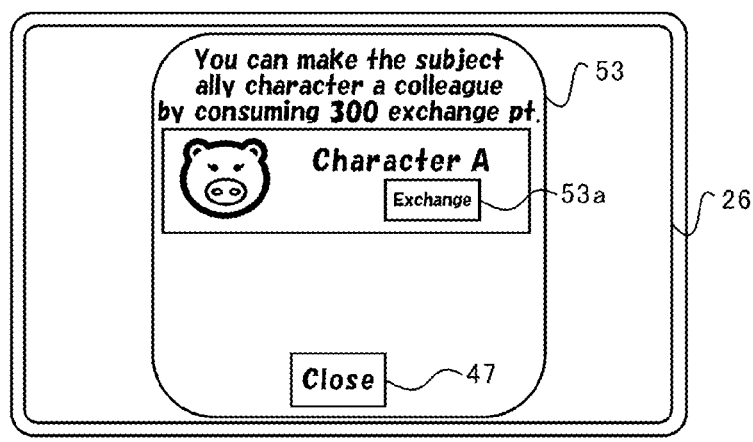
FIG. 6C is an illustration for explaining an example exchange-lineup popup.

FIG. 6A is an illustration for explaining an example gacha screen. FIG. 6B is an illustration for explaining an example gacha result screen. FIG. 6C is an illustration for explaining an example exchange-lineup popup 53.

When the gacha-screen selection operating part 30d is tapped in the home screen shown in FIG. 3A, the gacha screen shown in FIG. 6A is displayed on the display 26. A gacha-type selection bar 47 is displayed in an upper part of the gacha screen. In the gacha-type selection bar 47, gacha-type operating parts indicating the types (selectable types) of gacha currently being held (conducted) are displayed.

In this embodiment, the following gacha types are provided: "Normal", with which it is possible to acquire items; as well as "Characters", "Pickup", "Fest", "SP fest", "S dash", and "Three stars won", with which it is possible to acquire ally characters. In "Normal", it is possible to acquire items for free twice a day.

With the gacha types with which it is possible to acquire ally characters, it is possible to have a lottery performed by consuming a prescribed amount of the second currency. Furthermore, among the individual gacha types, at least either of the ally characters that are subject to lottery and the lottery probabilities (winning probabilities) of the individual ally characters mutually vary. Furthermore, some gacha types have set therefor periods in which it is possible to perform lotteries.

Here, the ally characters are individually classified into one of the following types: normal characters, limited characters, and fest-limited characters. The normal characters are ally characters that can be acquired (that can be won) with all the gacha types with which it is possible to acquire ally characters. The limited characters are ally characters that can be acquired (that can be won) in "Pickup". The fest-limited characters are ally characters that can be acquired (that can be won) in "Fest" or "SP fest". That is, it can be said that the fest-limited characters are ally characters exclusive for "Fest" or "SP fest". Note that it is possible to acquire the same fest-limited character in multiple sessions of "Fest".

Furthermore, "Pickup", "Fest", "SP fest", "S dash", and "Three stars won" individually have set in advance therefor periods in which it is possible to perform lotteries (hereinafter referred to as holding periods). In "Pickup", by using a prescribed normal character or limited character as a subject character, a setting is made such that the winning probability of the subject character is set to be higher than that of the other ally characters. Furthermore, in "Pickup", for example, the subject character is changed every two weeks. Therefore, it can be said that the gacha types of "Pickup" with different subject characters or holding periods mutually vary.

In "Fest", by using a prescribed fest-limited character as a subject character, the winning probability of the subject character is set to be higher than that of the other ally characters. Furthermore, in "Fest", the winning probabilities of ally characters initially having three stars (ranks) are set to be twice as high as that in "Character". "Fest" is held instead of "Pickup" and "Character", for example, for three days. Furthermore, it can be said that the gacha types of "Fest" with different subject characters or holding periods mutually vary. Note that "Fest" may be held concurrently with "Pickup" and "Character".

"SP fest" is gacha for a player who has newly started the game. As will be described later in detail, "SP fest" is held for 72 hours starting from the timing of completion of a prescribed tutorial. In "SP fest", "Fest" having the nearest holding period among "Fest" sessions that have already been finished is held.

"S dash" is gacha for a player who has newly started the game. "S dash" is held, for example, for seven days starting from the timing of completion of a prescribed tutorial. In "S dash", when a series of ten gacha is performed, which will be described later, at least one ally character initially having three stars (rank) is determined.

In "Three stars fixed", when a series of ten gacha is performed, which will be described later, at least one ally character initially having three stars (rank) is determined.

The server 100 stores, for each gacha type, a lottery table in which the lottery probabilities of ally characters are set, as well as holding period information (information indicating a period during which it is possible to refer to the lottery table), and a lottery (gacha) is performed by using the lottery table for a selected gacha type.

In the gacha-type selection bar 47, the gacha-type operating parts corresponding to the types of gacha currently being held are displayed. For example, in the example in FIG. 6A, the following operating parts are displayed: a normal-gacha operating part 47a corresponding to "Normal"; a character-gacha operating part 47b corresponding to "Character", and a pickup-gacha operating part 47c corresponding to "Pickup".

In the gacha-type selection bar 47, the gacha-type operating part corresponding to a selected gacha type is displayed in a highlighted manner so that the selected gacha type can be distinguished.

For example, as shown in FIG. 6A, in the case where the pickup-gacha operating part 47c is selected, an image corresponding to "Pickup" is displayed at the center of the display 26. Specifically, an image labelled as "Pickup gacha" is displayed, or the image of an ally character (e.g., character A) serving as a subject character in "Pickup" is displayed. Furthermore, in the gacha screen, the second currency possessed by the player, as well as exchange points (exchange pt), which will be described later, are displayed.

Furthermore, in the gacha screen, a lottery operating part for executing a lottery is displayed. Specifically, the following operating parts are displayed: a first lottery operating part 51a for performing a lottery by consuming 50 in the second currency, which is limited to once a day; a second lottery operating part 51b for performing a lottery by consuming 150 in the second currency; and a third lottery operating part 51c for performing ten lotteries collectively (performing what is called a series of ten gacha) by consuming 1500 in the second currency.

Furthermore, for example, when the first lottery operating part 51a is tapped (when a determination request operation is performed), at the server 100, a lottery is performed with reference to the lottery table corresponding to "Pickup" currently being held, an ally character (ally character ID) determined by the lottery is stored in association with the player ID, and lottery result information indicating the determined ally character is transmitted to the player terminal 1. At the player terminal 1, upon receiving the lottery result information, the gacha result screen shown in FIG. 6B is displayed on the display 26. In the gacha result screen, the image of the ally character indicated by the lottery result information is displayed.

Furthermore, in the gacha screen, an exchange-lineup operating part 52 is displayed. When the exchange-lineup operating part 52 is tapped, the exchange-lineup popup 53 shown in FIG. 6C is displayed. In the exchange-lineup popup 53, the subject character (character A) for which exchange points can be exchanged is displayed, and an exchange operating part 53a for exchanging exchange points for the subject character is displayed.

Here, exchange points are increased by one point each time a lottery for "Pickup" or "Character" is performed. Furthermore, when the exchange points reach 300 points, the exchange operating part 53a is enabled. When the exchange operating part 53a is tapped, 300 points are subtracted from the exchange points, and the ally character is assigned to the player (the ally character ID thereof is stored in association with the player ID). Note that when "Pickup" currently being held is finished, the exchange points are changed (reset) to zero points.

Figure 7C:
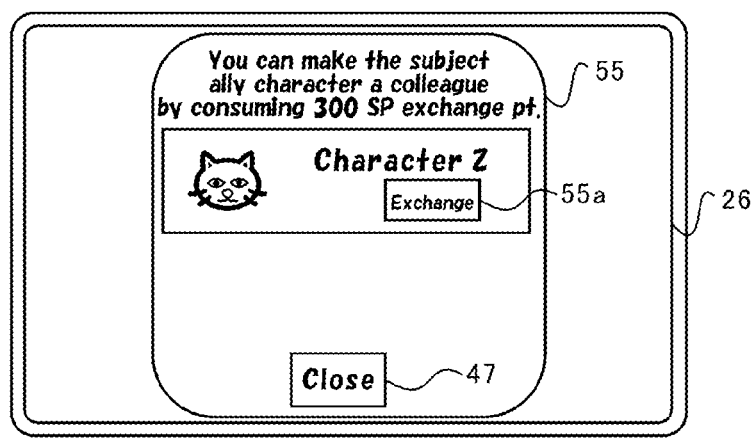
FIG. 7C is an illustration for explaining an example SP-exchange-lineup popup in the SP-fest holding period.

FIG. 7A is an illustration for explaining an example gacha screen in a fest holding period. FIG. 7B is an illustration for explaining an example gacha screen in an SP-fest holding period. FIG. 7C is an illustration for explaining an example SP-exchange-lineup popup 55 in the SP-fest holding period.

As described earlier, during the holding period of "Fest" (hereinafter referred to as the fest holding period), a lottery for "Fest" instead of "Pickup" and "Character" is performed. While the lottery for "Fest" is being performed, as shown in FIG. 7A, a fest-gacha operating part 47d corresponding to "Fest" and the normal-gacha operating part 47a are displayed in the gacha-type selection bar 47 in the gacha screen.

Furthermore, in the case where the fest-gacha operating part 47d is selected, an image corresponding to "Fest" is displayed at the center of the display 26 in the gacha screen. For example, an image labelled as "Fest gacha" is displayed, or fest-limited characters serving as subject characters in "Fest" (e.g., characters X and Y) are displayed. The exchange points are increased by one point each time a lottery for "Fest" is performed, and it becomes possible to acquire fest-limited characters serving as subject characters (e.g., characters X and Y) when the exchange points reach 300 points.

In "Fest", it is possible to acquire a fest-limited character through a lottery. With a fest-limited character, it is likely that the player can proceed with the game more advantageously compared with a normal character or a limited character (a fest-limited character is often a strong character). Thus, by performing a lottery for "Fest" during the fest holding period and acquiring a fest-limited character, it becomes possible for the player to advantageously proceed with the subsequent game (battle games).

Meanwhile, a player newly starting the game wishes to acquire fest-limited characters in order to advantageously proceed with the game. However, fest-limited characters can be acquired only in fest holding periods. Thus, unless the player starts the game during a fest holding period, the player cannot acquire fest-limited characters until the next fest holding period, which might decrease motivation for the game.

Thus, in this embodiment, for a player who has newly started the game, a certain period in which a lottery for "Fest" can be performed only for that player (hereinafter referred to as an SP-fest holding period) is set.

The SP-fest holding period is set to 72 hours from the timing of the first clearing of the normal quest "1-2". Here, the normal quest "1-2" is executed in what is called a tutorial, in which how to proceed with the game is lectured, and the first clearing of the normal quest "1-2" is set as a condition for finishing the tutorial. That is, a player who has newly started the game can have a lottery for "SP fest" performed for 72 hours starting from the timing of finishing the tutorial.

Furthermore, "S dash" is also held for seven days starting from the timing of finishing the tutorial.

During the SP-fest holding period, for example, as shown in FIG. 7B, in the gacha-type selection bar 47 in the gacha screen, the following operating parts are displayed: a normal-gacha operating part 47a, a character-gacha operating part 47b, a pickup-gacha operating part 47c, an S-dash-gacha operating part 47e, a three-stars fixed-gacha operating part 47f corresponding to "Three stars fixed", and an SP-fest-gacha operating part 47g corresponding to "SP fest".

In the case where the SP-fest-gacha operating part 47g is selected, an image corresponding to "SP fest" is displayed at the center of the display 26 in the gacha screen. For example, an image labelled as "SP fest gacha" is displayed, or the time to the end of the SP-fest holding period (e.g., "71:58:30 remaining") and the image of a fest limited character serving as a subject character in "SP fest" (e.g., character Z) are displayed.

Furthermore, in the case where the SP-fest-gacha operating part 47g is selected, in the gacha screen, SP exchange points are displayed instead of the exchange points, and an SP-exchange-lineup operating part 54 is displayed instead of the exchange-lineup operating part 52. The SP exchange points are managed separately from the exchange points, and are increased by one point each time a lottery for "SP fest" is performed. Alternatively, the SP exchange points may be shared with the exchange points.

When the SP-exchange-lineup operating part 54 is tapped, the SP-exchange-lineup popup 55 shown in FIG. 7C is displayed. In the SP-exchange-lineup popup 55, an ally character (character Z) that can be exchanged for SP exchange points is displayed, and an SP-exchange operating part 55a for exchanging SP exchange points for the ally character is displayed. Furthermore, when the SP exchange points reach 300 points, the SP-exchange operating part 55a is enabled. When the SP-exchange operating part 55a is tapped, 300 points are subtracted from the exchange points and the ally character is assigned to the player.

FIGS. 8A to 8D are figures for explaining lottery tables for "SP fest". Suppose that, as shown in FIGS. 8A to 8D, the first "Fest", the first "Pickup", the second "Pickup", the second "Fest", and the third "Pickup" are held in this order. Note that different lottery tables are used in all these gacha sessions.

Figure 8A:
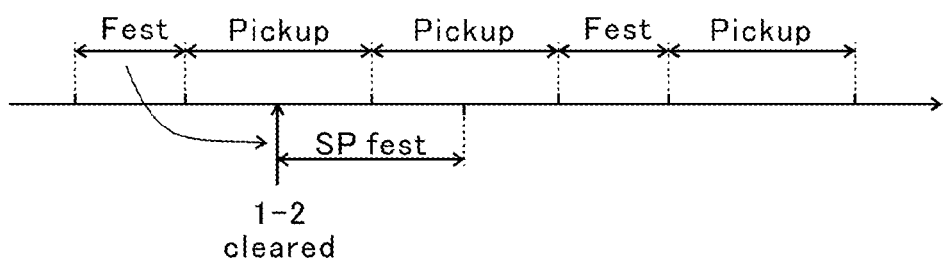
FIG. 8A is a figure for explaining lottery tables for an "SP fest".

Furthermore, suppose that, as shown in FIG. 8A, the player clears the normal quest "1-2" for the first time when the first "Fest" is finished and the first "Pickup" is being held. In this case, in "SP fest", the lottery table for the first "Fest" is used. That is, in "SP fest", it is possible to acquire an ally character by the same lottery probability as in the first "Fest".

Figure 8B:
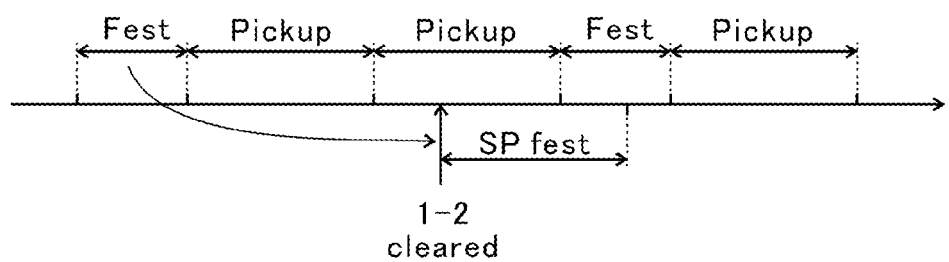
FIG. 8B is a figure for explaining lottery tables for an "SP fest".

Alternatively, suppose that, as shown in FIG. 8B, the player clears the normal quest "1-2" for the first time when the first "Fest" and the first "Pickup" are finished and the second "Pickup" is being held. In this case, similarly to the case in FIG. 8A, in "SP fest", the lottery table for the first "Fest" is used. That is, in "SP fest", it is possible to acquire an ally character by the same lottery probability as in the first "Fest".

Figure 8C:
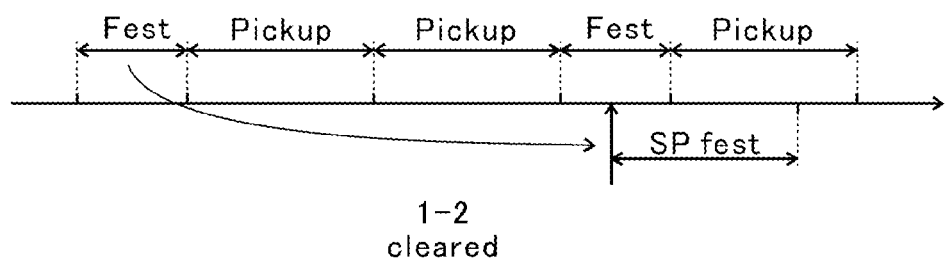
FIG. 8C is a figure for explaining lottery tables for an "SP fest".

Alternatively, suppose that, as shown in FIG. 8C, the player clears the normal quest "1-2" for the first time when the first "Fest", the first "Pickup", and the second "Pickup" are finished and the second "Fest" is being held. In this case, similarly to the cases in FIGS. 8A and 8B, in "SP fest", the lottery table for the first "Fest" is used. Furthermore, while the second "Fest" is being held, both "Fest" and "SP fest" are held.

Figure 8D:
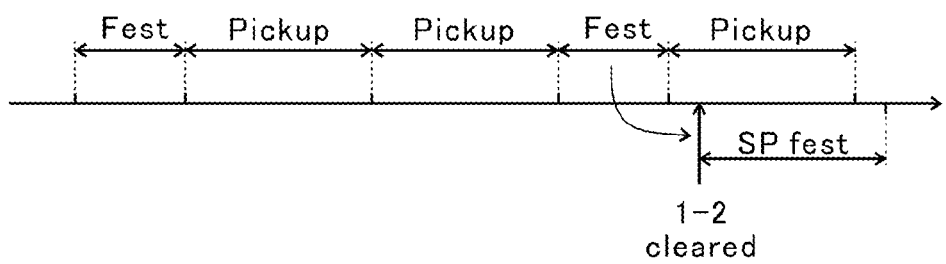
FIG. 8D is a figure for explaining lottery tables for an "SP fest".

Alternatively, suppose that, as shown in FIG. 8D, the player clears the normal quest "1-2" for the first time when the first "Fest", the first "Pickup", the second "Pickup", and the second "Fest" are finished and the third "Pickup" is being held. In this case, in "SP fest", the lottery table for the second "Fest" is used.

That is, "SP fest" is performed by using the lottery table for a past "Fest" already finished at the timing of the first clearing of the normal quest "1-2". More specifically, in "SP fest", the lottery table for the "Fest" most recently held among a plurality of sessions of "Fest" is used.

In "Fest", there are cases where a new fest-limited character is added. Furthermore, it is likely that the player can proceed with the game more advantageously with the newly added fest-limited character than with other fest-limited characters (the newly added fest-limited character is often a strong character). Thus, by letting a player newly starting the game perform "SP fest" using the lottery table for the "Fest" most recently held, the player is allowed to acquire a fest-limited character with which the player can proceed with the game more advantageously. Accordingly, a player newly starting the game can acquire a fest-limited character after finishing the tutorial, which serves to increase motivation for the game.

Figure 9A:
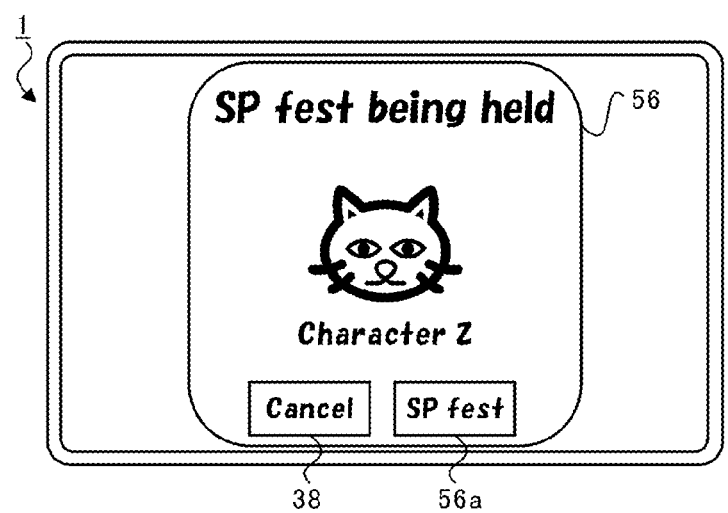
FIG. 9A is an illustration for explaining a popup indicating that an SP fest is being held.
Figure 9B:
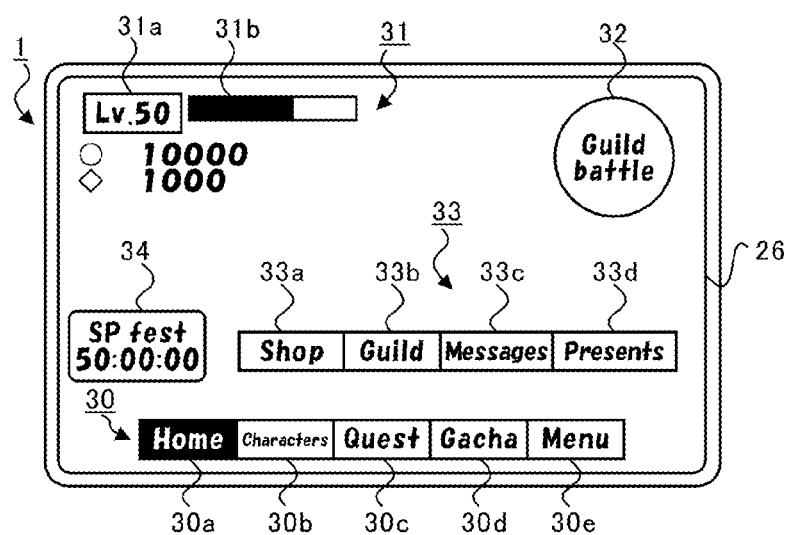
FIG. 9B is an illustration for explaining a home screen in the SP-fest holding period.

FIG. 9A is an illustration for explaining a popup 56 indicating that SP fest is being held. FIG. 9B is an illustration for explaining a home screen during an SP-fest holding period.

When the player logs in during an SP-fest holding period, the popup 56 indicating that an SP fest is being held, shown in FIG. 9A, is displayed on the display 26 in a manner superimposed on the home screen. In the popup 56 indicating that an SP fest is being held, the image of an ally character serving as a subject character in "SP fest" is displayed, and an SP-fest operating part 56a for displaying the gacha screen in which "SP fest" has been selected, as well as a cancel operating part 38, are displayed.

When the SP-fest operating part 56a is tapped, a gacha screen like the one shown in FIG. 7B is displayed on the display 26.

Furthermore, in the case where the home screen is displayed during the SP-fest holding period, as shown in FIG. 9B, the banner 34 displays that SP fest is being held, as well as the time to the end of the SP-fest holding period. Furthermore, when the banner 34 is tapped, a gacha screen like the one shown in FIG. 7B is displayed on the display 26.

Figure 10A:
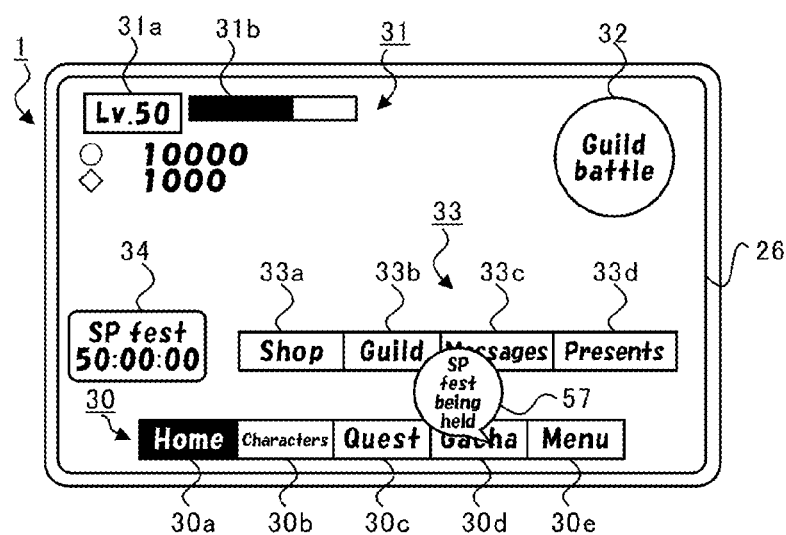
FIG. 10A is an illustration for explaining a balloon image.

FIG. 10A is an illustration for explaining a balloon image 57. FIG. 10B is an illustration for explaining priorities of balloon images 57.

As shown in FIG. 10A, in the case where a specific condition is satisfied, a balloon image 57 corresponding to the specific condition is displayed in a manner superimposed on the gacha-screen selection operating part 30d. As specific conditions, the following conditions are set: the current timing falls within the holding period of "Fest", "SP fest", or "Three stars fixed"; the current timing falls within a period in which a series of ten gacha can be performed for free (a free series of ten gacha is being held); and the exchange points or SP exchange points have reached 300 points.

Furthermore, in the case where a plurality of specific conditions are satisfied, a balloon image 57 corresponding to the specific condition having the highest priority is displayed on the display 26 on the basis of the priorities shown in FIG. 10B. According to FIG. 10B, the highest priority is set for the condition that the exchange points have reached 300 points in a fest holding period, and the next highest priority is set for the condition that the SP exchange points have reached 300 points in an SP-fest holding period. Furthermore, priorities are set in the following order: the exchange points have reached 300 points while Pickup is being held; a free series of ten gacha is being held; the current timing falls within a fest holding period (Fest is being held); the current timing falls within an SP-fest holding period (SP fest is being held); and the current timing falls within a three-stars-fixed holding period (Three stars fixed is being held).

As described above, by displaying a balloon image 57, it is possible to notify the player that a specific condition is satisfied.

Next, the basic configurations of and communication processes by the player terminal 1 and the server 100 for executing a lottery process will be described. Here, the description will be directed to an example of basic communication processes for running the game and main communication processes concerning the lottery process, and descriptions of other processes will be omitted.

(Functional Configuration of Player Terminal 1)

Figure 11:
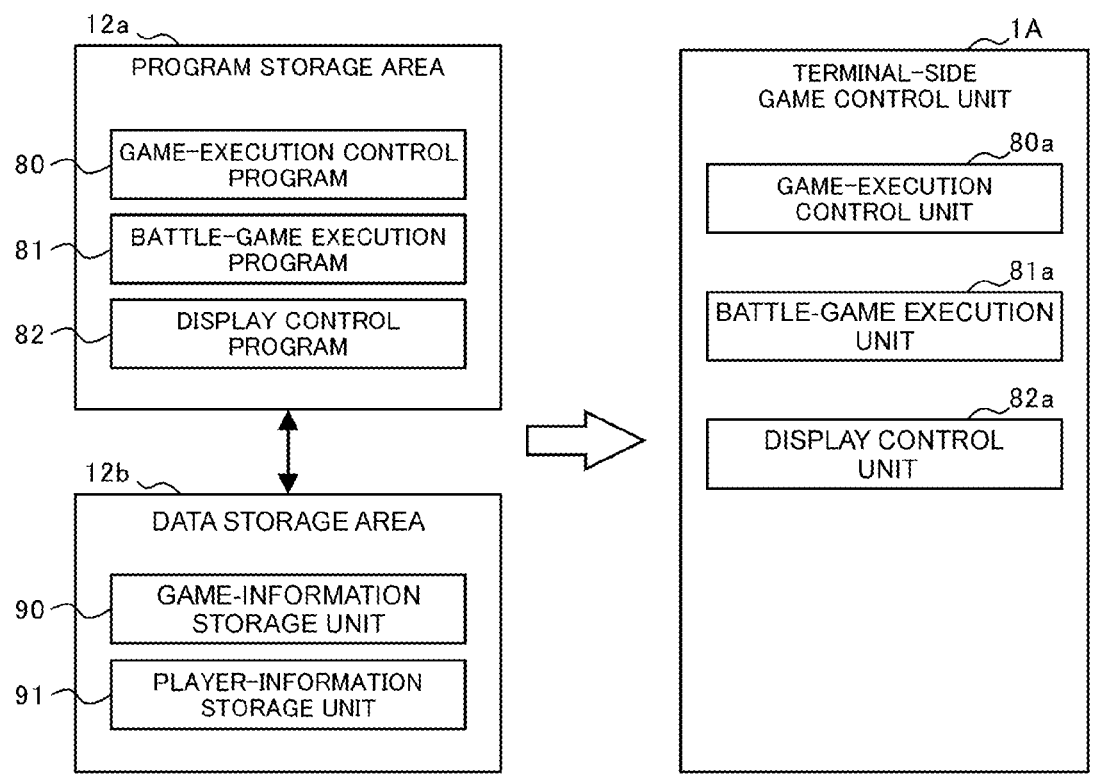
FIG. 11 is a diagram for explaining the configuration of a memory in the player terminal, as well as the functions thereof as a computer.

FIG. 11 is a diagram for explaining the configuration of the memory 12 at the player terminal 1, as well as the functions thereof as a computer. In the memory 12, a program storage area 12a and a data storage area 12b are provided. Upon the start of the game, the CPU 10 stores terminal-side game control programs (modules) in the program storage area 12a.

The terminal-side game control programs include a game-execution control program 80, a battle-game execution program 81, and a display control program 82. Note that the programs listed in FIG. 11 are examples, and the terminal-side game control programs include a large number of other programs.

In the data storage area 12b, a game-information storage unit 90 and a player-information storage unit 91 are provided as storage units for storing data. Note that the storage units mentioned above are examples, and a large number of other storage units are provided in the data storage area 12b.

The CPU 10 runs the individual programs stored in the program storage area 12a to update the data in the individual storage units in the data storage area 12b. Then, by running the individual programs stored in the program storage area 12a, the CPU 10 causes the player terminal 1 (computer) to function as a terminal-side game control unit 1A. The terminal-side game control unit 1A includes a game-execution control unit 80a, a battle-game execution unit 81a, and a display control unit 82a.

Specifically, the CPU 10 runs the game-execution control program 80, thereby causing the computer to function as the game-execution control unit 80a. Similarly, the CPU 10 runs the battle-game execution program 81 and the display control program 82, thereby causing the computer to function as the battle-game execution unit 81a and the display control unit 82a, respectively.

The game-execution control unit 80a controls the proceeding of the game as a whole. The game-execution control unit 80a transmits log-in information to the server 100, for example, at the time of log-in. Furthermore, the game-execution control unit 80a executes control concerning transitions among normal screens. Furthermore, in the case where game information concerning the game in general is updated, the game-execution control unit 80a receives the game information from the server 100 and saves the game information in the game-information storage unit 90.

The battle-game execution unit 81a is in charge of control for executing battle games. For example, on the basis of operations input to the player terminal 1, the battle-game execution unit 81a updates battle screens, controls actions of ally characters and enemy characters, and derive damage points.

The display control unit 82a generates screens to be displayed on the display 26 and causes the display 26 to display the generated screen.

(Functional Configuration of Server 100)

Figure 12:
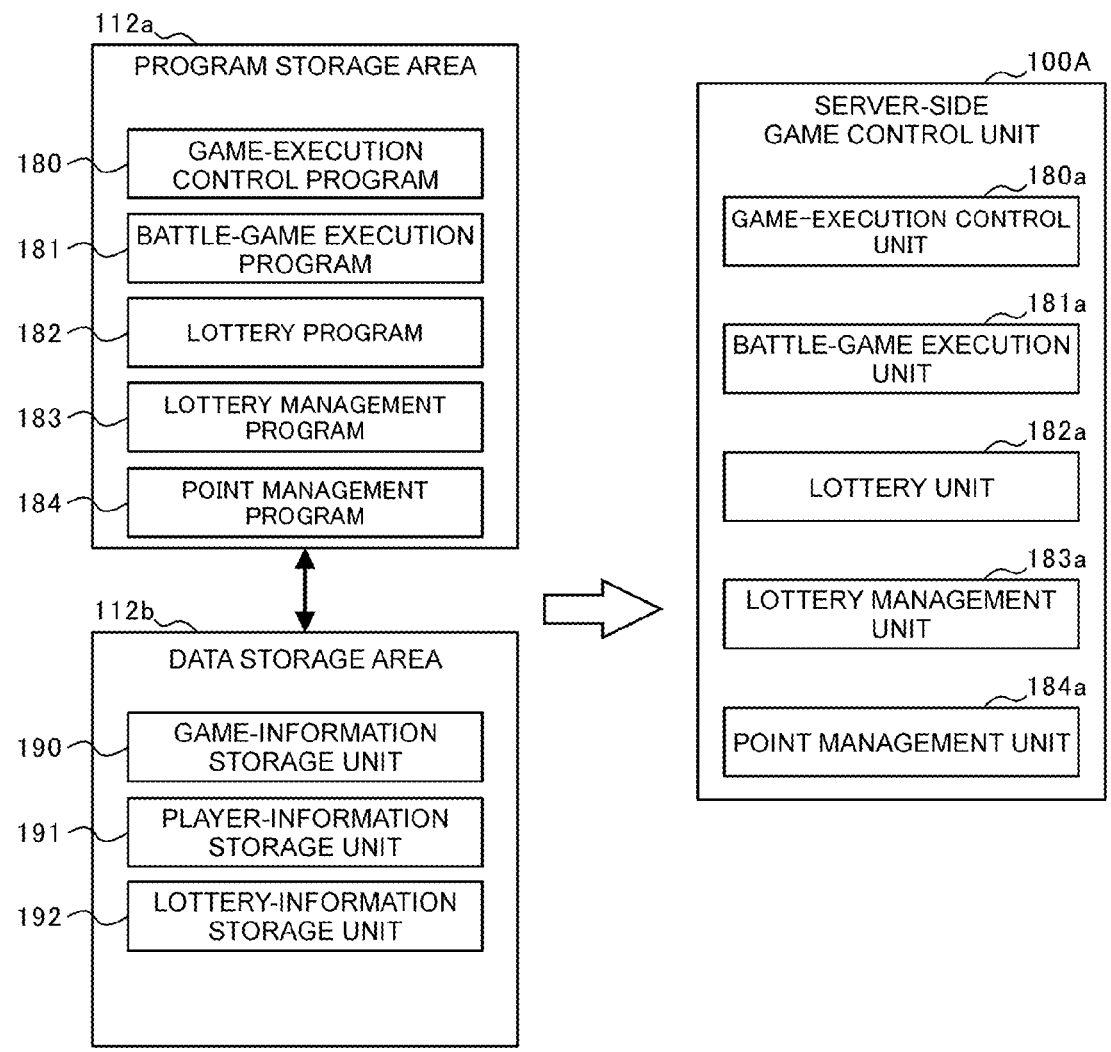
FIG. 12 is a diagram for explaining the configuration of a memory in the server, as well as the functions thereof as a computer.

FIG. 12 is a diagram for explaining the configuration of the memory 112 at the server 100, as well as the functions thereof as a computer. In the memory 112, a program storage area 112a and a data storage area 112b are provided. Upon the start of the game, the CPU 110 stores server-side game control programs (modules) in the program storage area 112a.

The server-side game control programs include a game-execution control program 180, a battle-game execution program 181, a lottery program 182, a lottery management program 183, and a point management program 184. Note that the programs listed in FIG. 12 are examples, and the server-side game control programs include a large number of other programs.

In the data storage area 112b, a game-information storage unit 190, a player-information storage unit 191, and a lottery-information storage unit 192 are provided as storage units for storing data. Note that the storage units mentioned above are examples, and a large number of other storage units are provided in the data storage area 112b.

The CPU 110 runs the individual programs stored in the program storage area 112a to update the data in the individual storage units in the data storage area 112b. Then, by running the individual programs stored in the program storage area 112a, the CPU 110 causes the server 100 to function as a server-side game control unit 100A. The server-side game control unit 100A includes a game-execution control unit 180a, a battle-game execution unit 181a, a lottery unit (determination unit and game-medium storage unit) 182a, a lottery management unit (management unit) 183a, and a point management unit 184a.

Specifically, the CPU 110 runs the game-execution control program 180, thereby causing the computer to function as the game-execution control unit 180a. Similarly, the CPU 110 runs the battle-game execution program 181, the lottery program 182, the lottery management program 183, and the point management program 184, thereby causing the computer to function as the battle-game execution unit 181a, the lottery unit 182a, the lottery management unit 183a, and the point management unit 184a, respectively.

The game-execution control unit 180a controls the proceeding of the game as a whole. Upon receiving log-in information from the player terminal 1, the game-execution control unit 180a transmits the player information saved in the player-information storage unit 191 to the player terminal 1. Furthermore, in the case where game information concerning the game in general is updated, the game-execution control unit 180a reads out the updated game information from the game-information storage unit 190 and transmits the game information to the player terminal 1.

The battle-game execution unit 181*a* is in charge of control for executing battle games.

The lottery unit 182*a*, when lottery request information is transmitted (when a determination request operation is performed) from the player terminal 1, executes a lottery process on the basis of the lottery request information (determination request operation) with reference to a lottery table selected by the lottery management unit 183*a*.

When the lottery request information is transmitted from the player terminal 1, the lottery management unit 183*a*, on the basis of the lottery request information (determination request operation), selects a lottery table based on the lottery request information from among a plurality of lottery tables stored in the lottery-information storage unit 192. Note that the lottery-information storage unit 192 stores lottery tables for the individual gacha types and holding period information for the individual gacha types. Furthermore, when a new gacha type is added, a lottery table for that gacha type and holding period information for that gacha type are stored in the lottery-information storage unit 192.

When the lottery process is executed by the lottery unit 182*a*, the point management unit 184*a* increases, by one, the exchange points or SP exchange points corresponding to the executed lottery process.

(Communication Processes Between Player Terminal 1 and Server 100)

Figure 13:
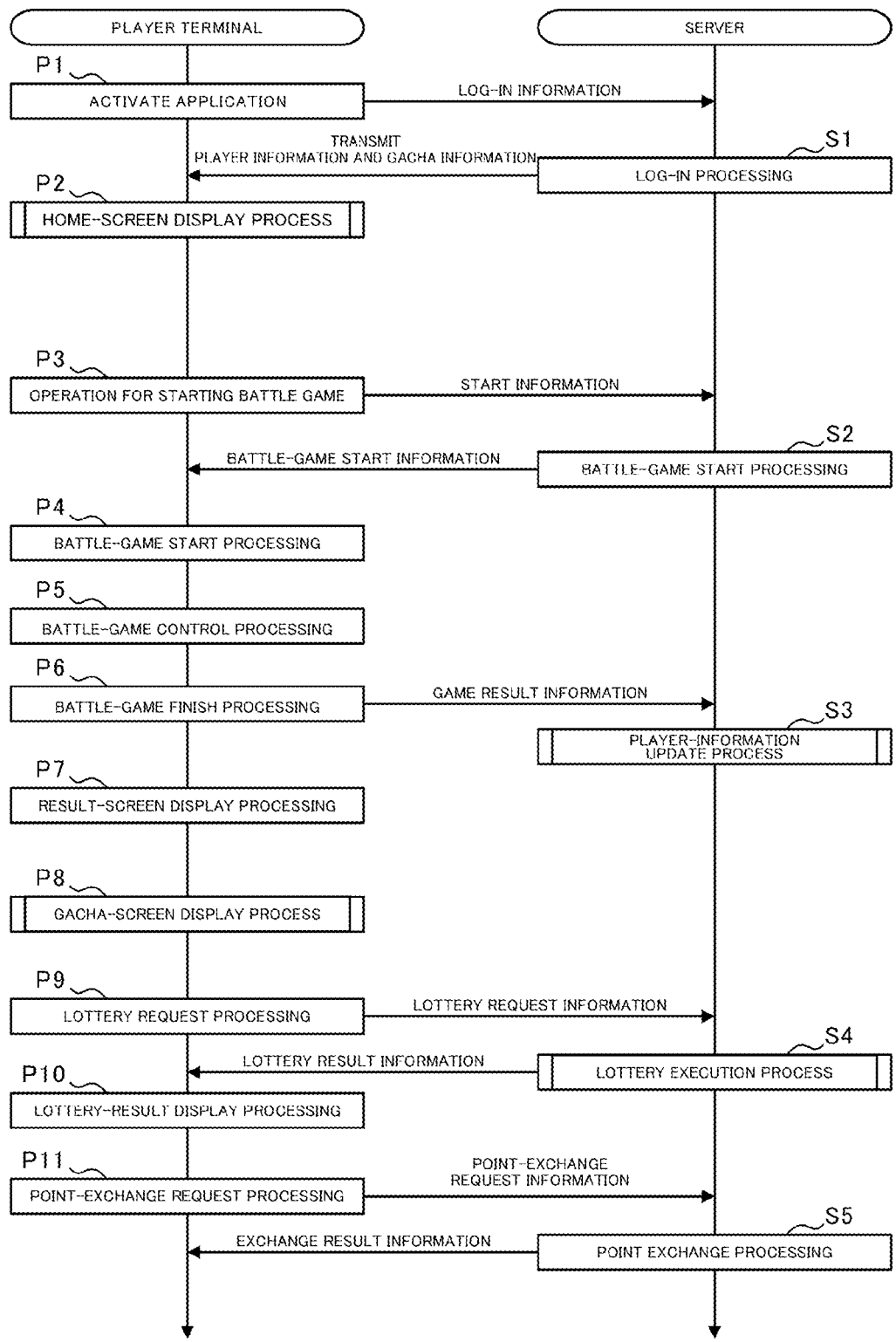
FIG. 13 is a sequence chart for explaining basic processes of the player terminal and the server.

FIG. 13 is a sequence chart for explaining basic processes of the player terminal 1 and the server 100. In the following description, processing steps at the player terminal 1 will be signified by Pn (n is an arbitrary integer). Furthermore, processing steps at the server 100 will be signified by Sn (n is an arbitrary number).

When the player activates a game application at the player terminal 1 (P1), the game-execution control unit 80*a* transmits log-in information to the server 100. Upon receiving the log-in information, the game-execution control unit 180*a* of the server 100 identifies the player ID associated with the log-in information and executes log-in processing (S1). Here, the game-execution control unit 180*a* reads the player information corresponding to the identified player ID from the player-information storage unit 191 and transmits the player information to the player terminal 1. Furthermore, the lottery management unit 183*a* transmits gacha information indicating the types of gacha currently being held to the player terminal 1 on the basis of the holding period information of the individual gacha types, stored in the lottery-information storage unit 192.

The display control unit 82*a* of the player terminal 1, upon receiving the player information and the gacha information, executes a home-screen display process (P2) for displaying a home screen on the basis of the player information and the gacha information. Furthermore, when the home-screen selection operating part 30*a* in the menu bar 30 is tapped, the display control unit 82*a* executes the home-screen display process (P2). The home-screen display process will be described later in detail.

Suppose further that an operation for starting a battle game is performed at the player terminal 1 (P3). In this case, start information is transmitted from the player terminal 1 to the server 100. Note that the start information includes party information selected by the player, type information of the battle game, etc. In response to the input of the start information, the battle-game execution unit 181*a* of the server 100 transmits battle-game start information needed for starting the battle game to the player terminal 1 (S2).

Then, upon receiving the battle-game start information, the battle-game execution unit 81*a* of the player terminal 1 executes battle-game start processing for starting the battle game (P4). Here, for example, an area of the memory 12 for proceeding with the battle game is allocated, and prescribed programs are loaded from the storage unit 18 into the memory 12.

Then, the battle-game execution unit 81*a* of the player terminal 1 executes battle-game control processing for controlling the battle game (P5). In the battle-game control processing, update processing for updating various kinds of information is executed repeatedly on a per-frame basis. The number of frames is not particularly limited, and for example, the number of frames per second is 30 to 60. Therefore, during the battle game, information is updated approximately every 16 ms (milliseconds) to 33 ms at the player terminal 1.

Furthermore, when a condition for finishing the battle game is satisfied, the battle-game execution unit 181*a* of the player terminal 1 executes battle-game finish processing for finishing the battle game (P6). In the battle-game finish processing, for example, game result information is transmitted to the server 100. Upon obtaining the game result information, the battle-game execution unit 181*a* of the server 100 updates the player information (S3). The player-information update process (S3) will be described later in detail. Furthermore, the display control unit 82*a* displays a result screen on the display 26 on the basis of the game result information (P7).

Furthermore, when an operation for displaying a gacha screen is performed at the player terminal 1, the display control unit 82*a* executes a gacha-screen display process (P8). Furthermore, when a lottery operating part is tapped in the gacha screen, the game-execution control unit 80*a* executes lottery request processing for transmitting lottery request information to the server 100 (P9). The lottery request information is configured so that the gacha type can be identified, and the lottery request information that is transmitted to the server 100 includes the following: the gacha type based on the gacha-type operating part selected in the gacha-type selection bar 47; and the number of lotteries and the amount of consumption of the second currency, corresponding to the tapped lottery operating part. Upon receiving the lottery request information, the lottery unit 182*a* of the server 100 executes a lottery process (S4) and transmits lottery result information indicating the result of lottery to the player terminal 1. Upon receiving the lottery result information, the display control unit 82*a* of the player terminal 1 displays the result of lottery indicated in the lottery result information (P10). The gacha-screen display process (P8) and the lottery process (S4) will be described later in detail.

Furthermore, when the exchange operating part 53*a* in the exchange-lineup popup 53 shown in FIG. 6C or the SP-exchange operating part 55*a* in the SP-exchange-lineup popup 55 shown in FIG. 7C is tapped, the game-execution control unit 80*a* transmits point-exchange request information corresponding to the tapped operating part to the server 100 (P11). Upon receiving the point-exchange request information, the point management unit 184*a* of the server 100, on the basis of the received point-exchange request information, stores the corresponding ally character ID in the player-information storage unit 191 in association with the player ID, and subtracts 300 from the exchange points or SP exchange points associated with the player ID (S5). Furthermore, the point management unit 184*a* transmits exchange result information to the player terminal 1, indicating that the ally character has been assigned.

Figure 14:
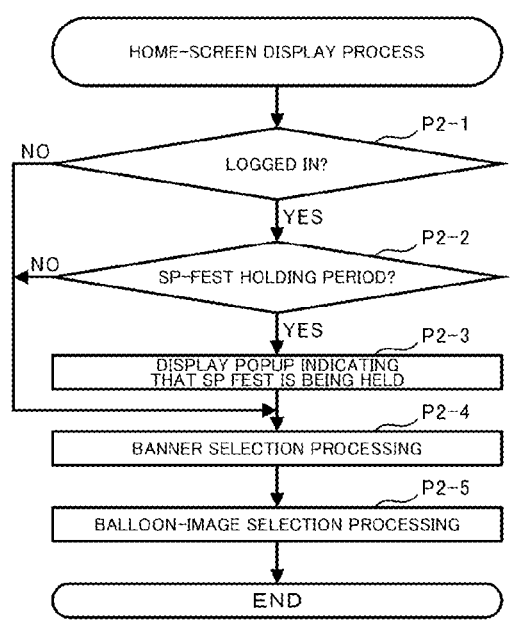
FIG. 14 is a flowchart for explaining a home-screen display process.

FIG. 14 is a flowchart for explaining the home-screen display process. As shown in FIG. 14, in the case where the player has logged in (YES in P2-1) and the current timing falls within an SP-fest holding period (P2-2), the display control unit 82a displays the popup 56 indicating that SP fest is being held, shown in FIG. 9A, in a manner superimposed on the home screen (P2-3). Furthermore, the display control unit 82a determines images to be displayed in the banner 34 when displaying the home screen, and displays one of the determined images as the banner 34 (P2-4). Furthermore, in the case where specific conditions for displaying balloon images 57 are satisfied, the display control unit 82a displays one of the balloon images 57 on the basis of the priorities shown in FIG. 10B (P2-5).

Figure 15:
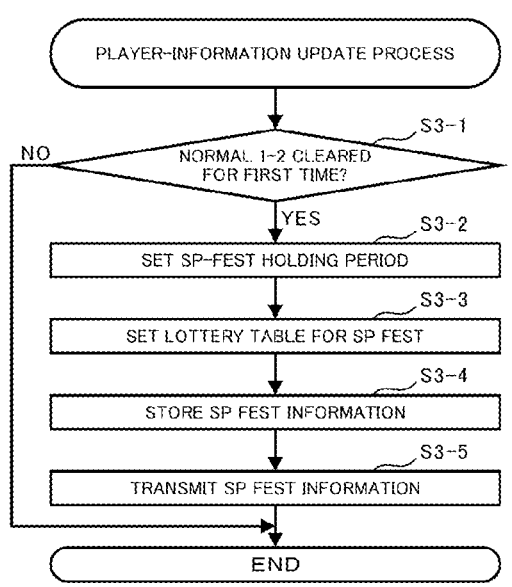
FIG. 15 is a flowchart for explaining a player-information update process.

FIG. 15 is a flowchart for explaining the player-information update process. As shown in FIG. 15, when game-result information indicating the clearing of the normal quest "1-2" is received for the first time by the game-execution control unit 180a (YES in S3-1), the lottery management unit 183a sets a period from the current timing to 72 hours later as an SP-fest holding period (S3-2). Furthermore, on the basis of the holding period information stored in the lottery-information storage unit 192, the lottery management unit 183a selects the lottery table for the most recent "Fest" with respect to the current timing, and sets the selected lottery table as the lottery table for "SP fest" (S3-3). Furthermore, the lottery management unit 183a stores the SP-fest holding period and the selected "SP fest" in the player-information storage unit 191 in association with the player ID (S3-4). Furthermore, the lottery management unit 183a transmits SP-fest information to the player terminal 1, indicating the SP-fest holding period and "SP fest" that is held (S3-5).

Figure 16:
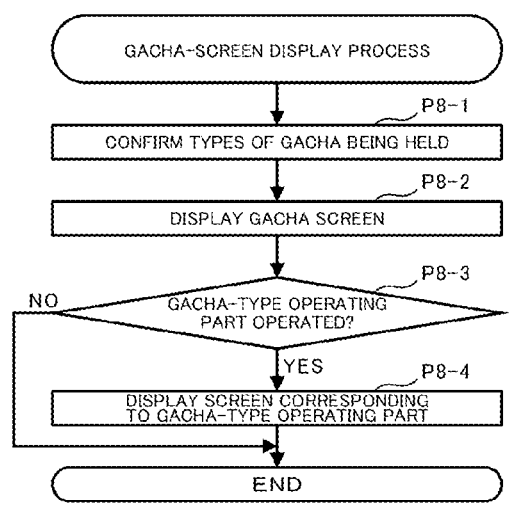
FIG. 16 is a flowchart for explaining a gacha-screen display process.

FIG. 16 is a flowchart for explaining the gacha-screen display process. As shown in FIG. 16, when an operation for displaying a gacha screen is performed, the display control unit 82a confirms the types of gacha currently being held on the basis of the gacha information (and SP fest information) (P8-1). Then, the display control unit 82a selects one of the gacha-type operating parts in the gacha-type selection bar 47 on the basis of the operation in response to which the gacha screen is displayed, and displays the gacha screen corresponding to the selected gacha-type operating part on the display 26 (P8-2). For example, in the case where the gacha-screen selection operating part 30d in the menu bar 30 is tapped, the display control unit 82a selects the gacha-type operating part disposed leftmost in the gacha-type selection bar 47. Alternatively, in the case where the banner 34 in an SP-fest holding period is tapped or in the case where the SP-fest operating part 56a in the popup 56 indicating that SP fest is being held is tapped, the display control unit 82a selects the SP-fest-gacha operating part 47g.

Furthermore, when the gacha-type operating part selected in the gacha-type selection bar 47 is operated (YES in P8-3), the display control unit 82a displays the gacha screen corresponding to the operated gacha-type operating part (P8-4).

Figure 17:
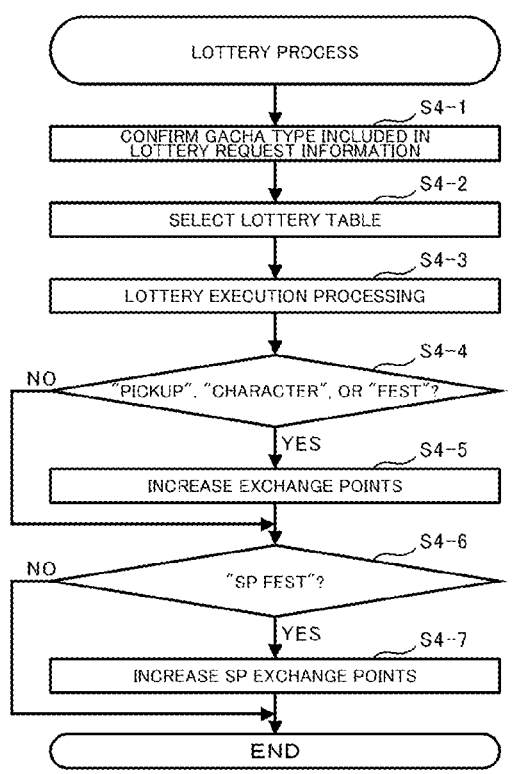
FIG. 17 is a flowchart for explaining a lottery process.

FIG. 17 is a flowchart for explaining the lottery process. As shown in FIG. 17, upon receiving lottery request information from the player terminal 1, the lottery management unit 183a confirms the gacha type included in the lottery request information (S4-1), and selects the lottery table for the confirmed gacha type (S4-2). Then, the lottery unit 182a executes lottery execution processing (determination processing) for determining an item or an ally character through a lottery with reference to the selected lottery table (S4-3), and stores the ally character (ally character ID) determined in the lottery execution processing in the player-information storage unit 191 in association with the player ID (S4-4).

In the case where the gacha type is one of "Pickup", "Character", and "Fest" (YES in S4-5), the point management unit 184a increases the exchange points by the number of lotteries (S4-6). Alternatively, in the case where the gacha type is "SP fest" (YES in S4-7), the point management unit 184a increases the SP exchange points by the number of lotteries (S4-8).

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

In the embodiment described above, in the player terminal 1, the game-execution control program 80, the battle-game execution program 81, and the display control program 82 are provided. Furthermore, the player terminal 1 includes the game-execution control unit 80a, the battle-game execution unit 81a, and the display control unit 82a. However, some or all of these programs and functional units may be provided in the server 100.

Furthermore, in the server 100, the game-execution control program 180, the battle-game execution program 181, the lottery program 182, the lottery management program 183, and the point management program 184 are provided. Furthermore, the server 100 includes the game-execution control unit 180a, the battle-game execution unit 181a, the lottery unit 182a, the lottery management unit 183a, and the point management unit 184a. However, some or all of these programs and functional units may be provided in the player terminal 1.

Furthermore, in the embodiment described above, as "SP fest", the most recently held "Fest" with respect to the first clearing of the normal quest "1-2" is held. However, the types of gacha held as "SP fest" are not limited to the above. For example, the gacha type may be the gacha type for which the greatest number of lotteries were executed in the past or may be selected from a plurality of kinds of "Fest" in each prescribed period. That is, it suffices for "SP fest" to be one of the gacha types held (conducted) in the past.

Furthermore, in the embodiment described above, the lottery management unit 183a determines the lottery table for the most recently held "Fest" as the lottery table to be referred to in "SP fest". However, for example, the lottery table to be referred to in "SP fest" may be manually set by the server administrator each time a fest holding period expires.

Furthermore, in the embodiment described above, "SP fest" is held for players who have cleared the normal quest "1-2" for the first time. However, for example, "SP fest" may be held for players who have not been engaged in the game, such as players who have not played the game for a certain period, players who have played gacha only a number of times less than a prescribed number, or players whose player ranks are less than a prescribed value.

Furthermore, in the embodiment described above, as "SP fest", the most recently held "Fest" with respect to the timing of the first clearing of the normal quest "1-2" is held. However, the reference timing may be the timing of the first log-in to the game or the time after an elapse of a prescribed time from the start of the game. That is, it suffices to hold "SP fest" at the timing when a prescribed condition is satisfied.

Furthermore, in the embodiment described above, the lottery unit 182a executes the lottery process for determining an item or an ally character (game medium) through a lottery with reference to a lottery table. However, the method of determining a game medium is not limited to the above as long as the lottery unit 182a executes, on the basis of a determination request operation input by the player, a determination process for determining one of a plurality of kinds of game media belonging to one of the types of gacha currently being conducted (selected types). For example, the lottery unit 182a may be configured to determine game media sequentially on the basis of a prescribed table.

Furthermore, the programs in the embodiment described above may be stored in a computer-readable storage medium and may be provided in the form of the storage medium. Alternatively, the programs may be provided in the form of a player terminal or an information processing system including the storage medium. Alternatively, the embodiment described above may be embodied in the form of an information processing method for realizing the individual functions and the steps shown in the flowcharts.

What is claimed is:

1. An information processing system comprising:
   a computer comprising a central processing unit (CPU) and a memory, the computer being connected to a display device and configured to perform a method comprising:
   receiving, using an input/output interface on the computer, a determination request operation from a player;
   executing, based on the determination request operation input by the player, determination processing for determining one kind of game media of a plurality of kinds of game media belonging to a selected type of a plurality of selected types currently being conducted;
   storing, as a possessed game medium, game medium in a storage unit in association with a player ID based on the one kind of game media;
   displaying, on the display device, a computer game using the possessed game medium stored in the storage unit; and
   allowing the execution of the determination processing, during a certain period that is set for each player, for the selected type conducted in the past,
   wherein, for the plurality of selected types, the storage unit stores a plurality of lottery tables in which at least either of the game media that belong thereto and lottery probabilities of the game media mutually vary, as well as periods during which it is allowed to refer to the plurality of lottery tables,
   wherein the computer executes the determination processing for determining the game medium through a lottery with reference to a lottery table among the plurality of lottery tables based on the determination request operation, and
   wherein the computer determines the lottery table that is referred to in the determination processing for the selected type conducted in the past based on the periods during which it is allowed to refer to the plurality of lottery tables.

2. The information processing system according to claim 1, wherein:
   the computer determines, as the lottery table that is referred to in the determination processing for the selected type conducted in the past, the lottery table whose period during which reference is allowed is nearest with respect to a timing at which a prescribed condition is satisfied.

3. The information processing system according to claim 1, wherein the lottery table that is referred to in the determination processing for the selected type conducted in the past is configured such that a winning probability of a specific one of the game media is higher than in the other lottery tables among the plurality of lottery tables that a special one of the game media is won.

4. The information processing system according to claim 2, wherein the lottery table that is referred to in the determination processing for the selected type conducted in the past is configured such that a winning probability of a specific one of the game media is higher than in the other lottery tables among the plurality of lottery tables that a special one of the game media is won.

5. An information processing method comprising:
   receiving, using an input/output interface on a computer, a determination request operation from a player;
   executing, based on the determination request operation input by the player, determination processing for determining one kind of game media of a plurality of kinds of game media belonging to a selected type of a plurality of selected types currently being conducted;
   storing, as a possessed game medium, game medium in a storage unit in association with a player ID based on the one kind of game media;
   displaying, on a display device, a computer game using the possessed game medium stored in the storage unit; and
   allowing the execution of the determination processing, during a certain period that is set for each player, for the selected type conducted in the past,
   wherein, for the plurality of selected types, the storage unit stores a plurality of lottery tables in which at least either of the game media that belong thereto and lottery probabilities of the game media mutually vary, as well as periods during which it is allowed to refer to the plurality of lottery tables,
   wherein the computer executes the determination processing for determining the game medium through a lottery with reference to a lottery table among the plurality of lottery tables based on the determination request operation, and
   wherein the computer determines the lottery table that is referred to in the determination processing for the selected type conducted in the past based on the periods during which it is allowed to refer to the plurality of lottery tables.

6. A non-transitory computer readable medium storing a program causing a computer to execute a method comprising:
   receiving, using an input/output interface on a computer, a determination request operation from a player;
   executing, based on the determination request operation input by the player, determination processing for determining one kind of game media of a plurality of kinds of game media belonging to a selected type of a plurality of selected types currently being conducted;
   storing, as a possessed game medium, game medium in a storage unit in association with a player ID based on the one kind of game media;
   displaying, on a display device, a computer game using the possessed game medium stored in the storage unit; and allowing the execution of the determination processing, during a certain period that is set for each player, for the selected type conducted in the past, wherein, for the plurality of selected types, the storage unit stores a plurality of lottery tables in which at least either of the game media that belong thereto and lottery probabilities of the game media mutually vary, as well as periods during which it is allowed to refer to the plurality of lottery tables, wherein the computer executes the determination processing for determining the game medium through a lottery with reference to a lottery table among the plurality of lottery tables based on the determination request operation, and wherein the computer determines the lottery table that is referred to in the determination processing for the selected type conducted in the past based on the periods during which it is allowed to refer to the plurality of lottery tables.

\* \* \* \* \*